(12) United States Patent
Tolhuizen et al.

(10) Patent No.: US 9,594,769 B2
(45) Date of Patent: Mar. 14, 2017

(54) COMPUTING DEVICE CONFIGURED WITH A TABLE NETWORK

(71) Applicant: KONINKLIJKE PHILIPS N.V., Eindhoven (NL)

(72) Inventors: Ludovicus Marinus Gerardus Maria Tolhuizen, Waalre (NL); Paulus Mathias Hubertus Mechtildis Antonius Gorissen, Eindhoven (NL); Alphons Antonius Maria Lambertus Bruekers, Nederweert (NL); Mina Deng, Shangai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/438,729

(22) PCT Filed: Dec. 19, 2013

(86) PCT No.: PCT/EP2013/077267
§ 371 (c)(1),
(2) Date: Apr. 27, 2015

(87) PCT Pub. No.: WO2014/096117
PCT Pub. Date: Jun. 26, 2014

(65) Prior Publication Data
US 2015/0293911 A1   Oct. 15, 2015

Related U.S. Application Data

(60) Provisional application No. 61/740,726, filed on Dec. 21, 2012, provisional application No. 61/767,856, filed on Feb. 22, 2013.

(30) Foreign Application Priority Data

Feb. 22, 2013 (EP) .................................... 13156302

(51) Int. Cl.
*B41K 3/38* (2006.01)
*G06F 17/30* (2006.01)
(Continued)

(52) U.S. Cl.
CPC ............. *G06F 17/302* (2013.01); *G09C 1/00* (2013.01); *H04L 9/003* (2013.01); *H04L 9/004* (2013.01);
(Continued)

(58) Field of Classification Search
CPC ...... G11B 20/00086; B41K 3/38; G06K 3/38; G06T 1/0064; G09C 1/00
(Continued)

(56) References Cited

U.S. PATENT DOCUMENTS

2010/0257343 A1    10/2010   Klug et al.
2012/0155638 A1*   6/2012    Farrugia ............... H04L 9/0631
                                                         380/45
(Continued)

FOREIGN PATENT DOCUMENTS

CN    102461058 A      5/2012
WO    2010102960 A1    9/2010
WO    2014095772 A1    6/2014

OTHER PUBLICATIONS

Joye et al: "Strengthening Hardware AES Implements Against Fault Attacks"; IET Inf. Secur., 2007, 1 (3), pp. 106-110.
(Continued)

*Primary Examiner* — Evans Desrosiers

(57) ABSTRACT

A computing device configured to compute a data function on a function-input value, the device comprising an electronic storage storing a first table network configured for the data function and a second table network configured to cooperate with the first table network for countering modifications made to the first table network, an electronic
(Continued)

processor coupled to the storage and configured to obtain first table inputs for the first table network, the first table inputs including the function-input value, and to compute the data function by applying the first table network to the first table inputs to produce first table outputs, the first table outputs including a function-output value corresponding to the result of applying the data function to the function-input value.

10 Claims, 10 Drawing Sheets

(51) Int. Cl.
    *G09C 1/00* (2006.01)
    *H04L 9/00* (2006.01)
    *H04L 29/08* (2006.01)
    *H04L 9/32* (2006.01)
(52) U.S. Cl.
    CPC .... *H04L 67/1097* (2013.01); *H04L 2209/043* (2013.01); *H04L 2209/16* (2013.01)
(58) Field of Classification Search
    USPC ......... 713/168–174, 182–186, 202; 709/206, 709/225, 229, 249, 389; 726/2–8; 380/59
    See application file for complete search history.

(56) References Cited

U.S. PATENT DOCUMENTS

2012/0300922 A1* 11/2012 Billet ................... H04L 9/0618
                                                          380/28
2013/0303077 A1* 11/2013 Ohmata ................ H04H 20/59
                                                          455/3.01

OTHER PUBLICATIONS

Karri et al: "Concurrent Error Detection Schemes for Fault-Based Side-Channel Cryptanalysis of Symmetric Block Ciphers"; IEEE Transactions on Computer-Aided Design of Integrated Circuits and Systems, vol. 21, No. 12, Dec. 2002, pp. 1509-1517.
Chow et al: "White-Box Cryptography and an AED Implementation"; SAC 2002, LNCS 2595, p. 250-270, 2003.
Wikipedia: "Triple Modular Redundancy"; Document Downloaded from https://en.wikipedia.org/wiki/Triple_modular_redundancy, on Aug. 10, 2012.

* cited by examiner

COMPUTING DEVICE CONFIGURED WITH A TABLE NETWORK

CROSS-REFERENCE TO PRIOR APPLICATIONS

This application is the U.S. National Phase application under 35 U.S.C. §371 of International Application No. PCT/EP2013/077267, filed on Dec. 19, 2013, which claims the benefit of U.S. Provisional Patent Application No. 61/740,726, filed on Dec. 21, 2012, U.S. Provisional Patent Application No. 61/767,856, filed on Feb. 22, 2013 and European Patent Application No. 13156302.5, filed on Feb. 22, 2013. These applications are hereby incorporated by reference herein.

FIELD OF THE INVENTION

The invention relates to a computing device configured to compute a data function on a function-input value, the device comprising an electronic storage storing a first table network configured for the data function, the computing device comprising an electronic processor coupled to the storage and configured to obtain multiple first table inputs for the first table network, the multiple first table inputs including the function-input value, and to compute the data function by applying the first table network to the multiple first table inputs to produce multiple first table outputs, the multiple first table outputs including a function-output value, the function-output value corresponding to the result of applying the data function to the function-input value.

BACKGROUND OF THE INVENTION

In traditional cryptography it was typically assumed that an attacker only gains access to the input and output values of a secure system. For example, the attacker would be able to observe a plain text going into a system and observe an encrypted text going out of the system. Although an attacker could try to gain an advantage by analyzing such input/output pairs, possibly even using computationally intense methods, he was not thought to have direct access to the system that implemented the input/output behavior.

Recently, it has become necessary to take threat models into account in which it is assumed that an attacker has some knowledge of the implementations. For example, one may consider the threat of side-channel analysis and of reverse engineering. Furthermore, the concerns that previously were mostly associated with security problems have extended to other fields, such as privacy. Although cryptographic systems processing security information such as cryptographic keys remain a prime concern, protection of other programs, e.g., those processing privacy relevant information has also become important.

It has long been known that computer systems leak some information through so-called side-channels. Observing the input-output behavior of a computer system may not provide any useful information on sensitive information, such as secret keys used by the computer system. But a computer system has other channels that may be observed, e.g., its power consumption or electromagnetic radiation; these channels are referred to as side-channels. For example, small variations in the power consumed by different instructions and variations in power consumed while executing instructions may be measured. The measured variation may be correlated to sensitive information, such as cryptographic keys. This additional information on secret information, beyond the observable and intended input-output behavior is termed a side-channel. Through a side-channel a computer system may 'leak' secret information during its use. Observing and analyzing a side-channel may give an attacker access to better information than may be obtained from cryptanalysis of input-output behavior only. One known type of side-channel attack is the so-called differential power analysis (DPA).

Current approaches to the side-channel problem introduce randomness in the computation. For example, in between genuine operations that execute the program dummy instructions may be inserted to blur the relationship between power consumption and the data the program is working on.

An even stronger attack on a computer is so called reverse engineering. In many security scenarios attackers may have full access to the computer. This gives them the opportunity to disassemble the program and obtain any information about the computer and program. Given enough effort any key hidden say in a program may be found by an attacker.

Protecting against this attack scenario has proven very difficult. One type of counter measure is so-called white-box cryptography. In white-box cryptography, the key and algorithm are combined. The resulting algorithm only works for one particular key. Next the algorithm may be implemented as a so-called, lookup table network. Computations are transformed into a series of lookups in key-dependent tables. See for example, "White-Box Cryptography and an AES Implementation", by S. Chow, P. Eisen, H. Johnson, P. C. van Oorschot, for an example of this approach.

SUMMARY OF THE INVENTION

The known countermeasures against side-channel attacks against computer systems are not entirely satisfactory. For example, the introduction of randomness may countered by statistical analysis. The obfuscation of software may be countered by more advanced analysis of the operation of the program. There is thus a need for more and better countermeasures.

For example, one way to obfuscate a computer program is to encode the input values and to operate as much as possible on encoded values. One may even use so-called table networks to perform computations. Such a table network may be crafted by hand, or by specialized programs, e.g. in the case of white-box cryptography, or by general purpose compilers. It was believed that, generally speaking, a table obfuscates the type of operation that is performed. However, the inventors have found that the latter is generally not true. Even if the input(s) and output (s) of a function are encoded, statistical properties of the input/output relations may reveal which function is being encoded. An example of this phenomenon follows.

Consider $W=\{0, 1, \ldots, N-1\}$, an encoding E, and its corresponding decoding $D=E^{-1}$. Let F and G denote encoded modulo N addition and encoded modulo N multiplication, respectively. That is, define F: $W \times W \rightarrow W$ as $F(x,y)=E(D(x) \oplus_N D(y))$, where $\oplus_N$ denotes modulo N addition, and G: $W \times W \rightarrow W$ as $G(x,y)=E(D(x) *_N D(y))$, where $*_N$ denotes modulo N multiplication.

For each fixed x, we have that $\{F(x,y)|y \in W\}=W$. Also, for each non-zero $x \in W$, and N prime, we have that $\{G(x,y)|y \in W\}=W$, and $\{G(0,y)|y \in W\}=E(0)$. For N non-prime similar patterns occur.

As a consequence, independent of the encoding E, one can determine that F cannot be an encoded modulo N multiplication, and that G cannot be an encoded modulo N addition. An attacker has at least two methods to do so. He could fix two different elements $x_1$ and $x_2$ in W and for H∈{F,G}, compare H $(x_1,y)$ and H $(x_2,y)$ for all y. If these quantities are different for all y, then H cannot represent modulo N multiplication; if these quantities agree for some y, then H cannot represent modulo N addition. An attacker who cannot choose which table entries to read, but can observe the results of table accesses of a running software program can use the fact that each element of W occurs equally often as output of while with G, the element E(0) occurs as an output much more frequently. So if an element of W occurs much more often than other elements of W as output of H, then H is more likely to be an obfuscated modulo N multiplication than an obfuscated modulo N addition.

In other words, even if one uses one of the best software obfuscations methods available, i.e., if one that uses full encoding of the input and output values and table-networks for the computations, then still some information may be obtained by inspection of the program. This situation is highly undesirable.

It has been found that this problem is addressed by the introduction of table networks that operate on multiple input values at the same time. The table network may apply a different function to different inputs or groups of inputs. Using an encoding which encrypts into a single value two or more of the multiple inputs together into a single value, it becomes impossible for an attacker to determine for what function the table network is intended since, indeed, it performs two functions. See the US provisional application with number U.S. 61/740,691, and title "Computing device comprising a table network" filed on 21 Dec. 2012, and/or the European patent application of the same title "Computing device comprising a table network", with filing date in 27 Dec. 2012 and file number EP12199387.

Although this system adds considerably to the security, there remains a vector of attack, especially if the attack model is widened further. We assume not only that an attacker has full access so that he may observe everything that happens in the system, we also prepare for an attacker who is able to modify the program. We consider two such modifications, modification to table entries and modification to variables. The first type of modification assumes less on the attacker since the modification could be made before program execution has started; the latter type of modification is done while the program is running and is therefore considered harder. For example, an attacker may try the following attack (most likely in an automated fashion). He modifies an entry in a table and runs the modified program for a variety of inputs. If none of the runs show any difference in the output of the original program and the modified program, he concludes that the modified table entry and the unmodified table entry are equal insofar relevant data is concerned and only differ in obfuscating computations, i.e., the so called state variables and state functions. Given sufficient time a map may be built up of classes of values that are equal insofar correct computation is concerned. Effectively, the state variable is thus eliminated. To be clear, because of encoding the attacker will not be able to observe directly if the data values are the same while state values are different, but he may be able to deduce this from analyzing the effect of table modifications.

It would be advantageous to have a computing device configured to compute a data function on a function-input value with increased resilience against program modifications.

A computing device configured to compute a data function on a function-input value is provided, which addresses at least this concern.

The computing device comprises an electronic storage and an electronic processor coupled to the storage. The electronic storage is configured to store a first table network configured for the data function f, and a second table network configured to cooperate with the first table network for countering modifications made to the first table network.

The processor is configured, e.g., through appropriate computer processor code, to obtain multiple first table inputs for the first table network, the multiple first table inputs including the function-input value, and to compute the data function by applying the first table network to the multiple first table inputs to produce multiple first table outputs, the multiple first table outputs including a function-output value, the function-output value corresponding to the result of applying the data function to the function-input value.

The processor is also configured to obtain multiple second table inputs for the second table network, the second table inputs including the multiple first table outputs and the second table inputs sharing at least one input with the multiple first table inputs, and to apply the second table network to the multiple second table inputs, the second table network being configured to verify for at least a specific one of the multiple first table outputs if an unmodified first table network could obtain the specific one of the multiple first table outputs from the given at least one of the multiple first table inputs.

The second table network produces second table outputs including a protected function output, the protected function output being equal to the function output in case the verification is successful and the protected function output being unequal to the function output in case the verification is unsuccessful. For example, one may configure the second table network so the protected function output is always unequal in case the verification is unsuccessful. However, in an advantageous implementation the output is randomized, e.g., the output in case of unsuccessful verification is selected randomly when the tables are constructed. In the latter case one may occasionally have an equal output. Taking state variables and random output as a reference one may require that the output should be unequal in case of unsuccessful verification in at least 90% of cases, i.e., of all table entries, i.e., of all possible first table inputs.

This computing device thus is obfuscated in a deep fashion and protected against the modification attack outlined earlier. Indeed, the first table network operates on multiple inputs and produces multiple outputs. Among the multiple inputs is at least one of the inputs to the data function, and among the multiple outputs is at least the function output. In the above mentioned patent application it has been described that such table networks may be constructed in a variety of ways. As part of such a construction the data function may have been evaluated for all possible input values.

The second table network verifies part of the computation of the first table network. To this end the second table network receives the output of the first table network, and shares at least part of the multiple inputs to the first table network. Since the second table network does not necessarily have all the multiple input values, it may not be possible for the second table network to do the full computation. Nevertheless, the second table network is chosen such that it can verify for at least one of the multiple first table outputs if an unmodified first table network would have given a different value. To put it in other words, the second table network verifies the existence of a multiple first table input including the inputted at least one of the multiple first table inputs, from which an unmodified first table network obtains the specific one of the multiple first table outputs. One practical way to achieve this is to perform part or all of the same computation that the first table network did, but this is not strictly necessary, e.g., given part of a function input, it may be possible to conclude that some function outputs have become impossible. Also in the latter example, this compatibility will have been established by enumeration during compilation and is looked up during execution.

There are least two ways in which the second table network may share an input with the multiple first table inputs. A first option is that one of the inputs of the first table network is copied to the second table network. A consequence of this approach is that, in case that input is encoded together with other inputs, those will also be inputs to the second table network. This may lead to larger tables than desired; to a certain extent this can be remedied using extraction tables, such as state extraction tables, to obtain one more inputs, e.g. a state, from inputs that are encoded together. A second option is to use shadow variables, that is one or more of the multiple inputs of the first network are maintained at least twice, possible in a different encoding. For example, the first table network may have function and state inputs whereas the second table network only shares the state inputs. In this case the inputs of the second table network need not be directly copied from the inputs of the first table network; the two networks have one or more inputs in common, but the common inputs need not necessarily come directly from the same source. This may lead to smaller tables in the second table network. On the other hand it requires, at least in parts of the program that some of the variables are maintained twice, i.e., as so-called shadow variables.

In case the second table network detects a modification to the first table network, it modifies the function output, i.e., outputs a protected function output unequal to the function output. This has the effect that the attacker will see changes because of his modification in a much more often than chance would indicate. For example, even if the attacker has modified unrelated data (e.g. states), this may be detected by the second table network who in turn causes the change to spread to data variables. The attack outlined above becomes much harder, if not impossible altogether.

In an embodiment, the multiple first table inputs further include a state-input value and the multiple first table outputs further include a state-output value, wherein the state-output value equals the result of applying a state function to the state-input value, and the second table network is configured to take as input the state-input value, the second table network is configured so that the protected function output is equal to the function output in case the result of applying the state function to the state-input value equals the state value included in the multiple first table outputs inputted to the second table network.

By computing two functions independently of each other, the data function and the state function in the same table network, it becomes possible to verify one of them. Thus the amount of work that needs to be done in the second table network is reduced. As a result one may design the second table network with fewer inputs, which has the result of a significantly smaller table.

In an embodiment, the first table network is configured to take as input an encoded input value, the encoded input value combining the function-input value together with a state-input value encoded together into a single value, and the first table network is configured to produce as output a first encoded output value, the first encoded output value combining the function-output value together with a state-output value encoded together into a single value, wherein the state-output value equals the result of applying a state function to the state-input value, the second table network is configured to take as input the first encoded output value of the first table network and at least one of the state-input value and the function-input value, the second table network being configured to produce as output a second encoded output value, the encoded output value containing the protected function output.

Encoding some or all of the multiple inputs and/or some or all of the multiple outputs together makes reverse engineering of the device much harder. An attacker does not know directly what a value represents, or indeed what the value is.

An encoding (often referred to as 'E') is a least partially reversible, that is, for some encoded pairs of a function input value and a state input value, the function input value and/or the state input value may be recovered; likewise, for an encoded pair of function output value and state output value. In a practical implementation, encodings are typically selected as fully reversible, although as noted above this is not strictly necessary. That is, for a fully reversible encoding one can recover both the function input value and the state input value for any encoded pair of a function input value and a state input value. Likewise, from an encoded pair of function output value and state output value, the function output value and the state output value may be recovered.

An encoding is private, that is, different implementations of the system may use a different way to encode input or output values together.

Furthermore, the encoding adheres at least in part to the principle of diffusion. The values in the encoded value depend on a large part of the encoded value. For example, when an input/output value is recovered from an encoded input/output value, then the input/output value depends preferably on all of the encoded input/output value; at least it depends on more bits than the bit size of the input/output value itself. This has the effect that the information on the input/output value is distributed over many bits. Preferably, if one has access to only part of an encoded value, it is impossible to recover the values it encodes, even if one had perfect knowledge of the encoding/decoding function. Note that traditionally, encryption frequently makes use of a key. Using a keyed encoding is an attractive possibility, but due the relatively small size of the input/output values it is also possible to represent the encoding as a table. For this reason encoding and encrypting in the context of variable values, such as input/output values or intermediates values are used interchangeably.

Because the table network may represent two functions, and indeed the encoded input values contains two inputs (the function and state), it is impossible to tell from the table network if it is an encoded version of the data function or of the state function. Indeed the table network is fully equipped to compute either function and indeed does compute both functions on an independent variable, or set of variables (in embodiments of data functions and-or state functions having multiple inputs).

For example, applied to the example above, one would obtain a table network which could be used to perform addition and multiplication. By inspection of the table network one cannot tell which one is used, since in fact the table network can perform either one.

The data function may take one or multiple input values. The state function may take one or multiple input values. In an embodiment, the number of input values of the data and state function is the same. For example, the device may be configured to obtain the multiple function-input values as multiple encoded input values. Each one of multiple encoded input values combines a function-input value of the multiple input values together with a state-input value of the multiple state input values encrypted together into a single value. The table network is configured to take as input the multiple encoded input values and produce as output an encoded output value. The encoded output value combines a function-output value together with a state-output value encrypted together into a single value. The function-output value equals the result of applying the data function to the multiple function-input values, and the state-output value equals the result of applying a state function to the multiple state-input values.

In an embodiment, the second table network is configured to produce as output a second encoded output value, the encoded output value combining the protected function output value together with a protected state-output value encrypted together into a single value, the protected state-output being equal to the result of applying a state permutation to the state-output value.

Adding a second table network that counters modifications to the first network significantly adds to the problems of attacking the system. However, if the attacker could find the second table network, he may be able to judge from its output whether or not a change was made by it. By always modifying the state value in the output of the second table network, an attacker cannot see if the second table network needed to apply a change to the function output or not, since an encoded value will change as a whole even if only one the value within it changes.

In an embodiment, the second table network comprise a state table and an alignment table network, the state table being configured for the state function, the processor being configured to apply the state table to the state-input to obtain a parallel state output value, the alignment table network being configured to receive as input at least the parallel state output value and the state-output value received from the first table network. In this way, state tables may parallel function tables. Multiple state and function table may be used before an alignment table network is done. This reduces the number of checks made on modification, while still detecting them. In this way code size is reduced.

In an embodiment, the second table network comprise a modified state table and an alignment table network, the state table being configured to receive as input a state-input value and to compute a modified state value, the modified state value being equal to the result of applying the state function to the state-input value followed by a further state function, the align table network is configured to take as input the state-output value and the modified state-output value and to verify that the further state function applied to the state-output value yields the modified state-output value.

In the state table a function composition is performed of the state function and a further state function, whereas in the first table network only the state function is used. The alignment table verifies if the state variable has the expected value. Note that the output is checked, not necessarily how it has been obtained. This protects against attacks which attempt to remove the alignment table network and replace its output say by the output of the first table network. Such an attempt would not work since the state variable and the data variable no longer run in parallel.

It is not necessary for the second table network to operate on the state values; other parts of the multiple inputs may used. In an embodiment, the second table network is configured to take as input the function-input value, the second table network is configured so that the protected function output is equal to the function output in case the result of applying the data function to the function-input value equals the function-output value encoded in the first encoded output value.

The function input and output may be 4, 5, 6, 7 or 8 bits, possibly even larger, say 16 bit, the state input and output values of the same size, or possibly smaller, say 2, or 3 bits. A practical choice is to have function and state values each 4 bits, and encoded values, containing a function and a state value, as 8 bits.

An aspect of the invention concerns a compiler configured for receiving the data function and for producing a first and second table network, wherein the first table network is configured to receive multiple first table inputs for the first table network, the multiple first table inputs including the function-input value, and to produce multiple first table outputs, the multiple first table outputs including a function-output value, the function-output value corresponding to the result of applying the data function to the function-input value, the second table network is configured to cooperate with the first table network for countering modifications made to the first table network, the second table network is configured to receive multiple second table inputs, the second table inputs including the multiple first table outputs and at least one of the multiple first table inputs, the second table network being configured to verify for at least a specific one of the multiple first table outputs if an unmodified first table network could obtain the specific one of the multiple first table outputs from the given at least one of the multiple first table inputs, the second table network produces second table outputs including a protected function output, the protected function output being equal to the function output in case the verification is successful and the protected function output being unequal to the function output in case the verification is unsuccessful.

The computing device is an electronic device, e.g., a mobile electronic device, mobile phone, set-top box, computer, or the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings.

Figure 1:
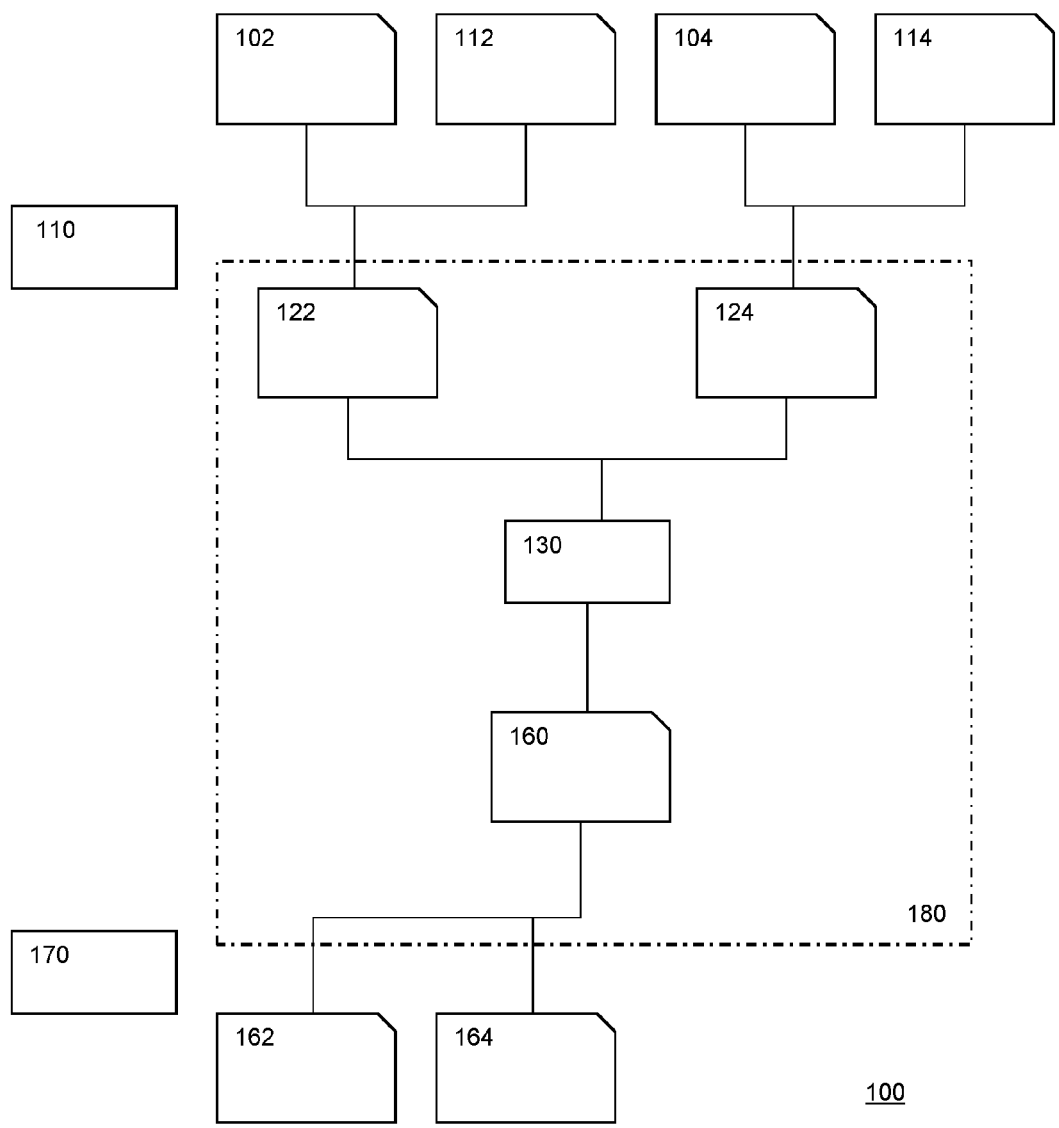
FIG. 1 is schematic chart illustrating a table network implementing a data function and a state function.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Figure 4:
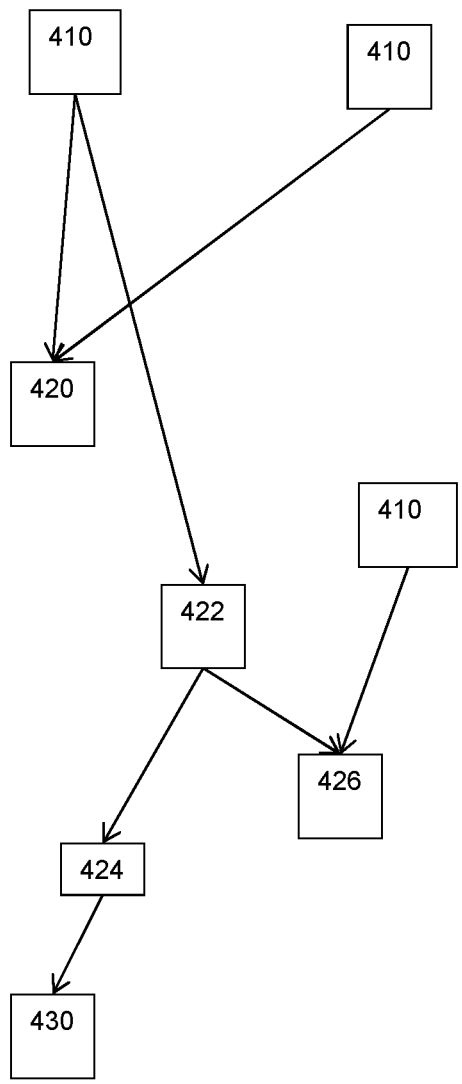
FIG. 4 is a block diagram illustrating table networks in general.

FIG. 4 illustrates the general concept of table network, shown is table network 400. Most functions may be expressed as a network of tables. In particular any composition of arithmetic and logic operations may be so expressed. For example, the network of tables, may be an implementation, e.g. of a cipher. Shown are 8 tables of multiple tables. A table transforms an input value to an output value by table-lookup of the input value. Shown are three of the input tables 410, for receiving input from outside the function implementation. Shown is one of the output tables 430. The output tables 430 together form the output of the function implementation, e.g. by concatenation. Shown are four tables of the intermediate tables 420, 422, 424, 426, who receive at least one input from another one of the tables, and who produce an output for use as an input for at least one other table; in the diagram for example intermediate tables 422 and 410 provide input for table 426. The tables together form a network. The cipher may be a block cipher; the block cipher may be configured for encryption or for decryption. The block cipher encrypts a block, say AES. The implementation may be for a particular key, in which case the tables may depend on the particular key.

Look-up table 426 represents an operator having two inputs and one output. The construction of look-up tables for monadic operators may be extended to dyadic operators. For example, the second input may be 'curried out'; referring to the function transformation technique, currying is the technique of transforming a function that takes n multiple arguments (or an n-tuple of arguments) in such a way that it can be called as a chain of functions, each with a single argument. When this approach is used the look-up table 426 is implemented as multiple monadic look-up tables. On the other hand one may also generate bit strings for each input and concatenate the results. In this way the look-up table is generated directly, and one single but larger look-up table is obtained. Although, the layout of the look-up tables may differ based on the construction, they have equal size and the same properties. Note that it is not necessary that the multiple input values are encoded according to the same encoding.

The table network may use multiple tables encoding two functions or have as sub network table networks that encode for two functions. Furthermore, the table network may incorporate one or first and second table network to prevent an attacker from using table and/or variable modification to learn useful information about the system.

The system may be configured to use that state or data function of a network table depending on the current encoding. Table network obfuscation techniques may be applied, also in table networks as described herein.

For example, suppose a second table receives as input the output of a first table, then the output of a first table may be encoded with a secret, e.g. randomly chosen, encoding, and the input of a second table may be encoded with the inverse encoding.

FIG. 1 shows a table network 180 embedded in a larger table network 100. Table network 180 as shown contains only a single table 130. As noted, it is possible to implement table 130 as a table network, in a trade-off, e.g., between table size, and security. In FIG. 1, tables are illustrated with rectangles, and values are illustrated with a rectangle with the upper right corner cut-off.

Table network 180 is configured to take multiple encoded input values as input, shown are encoded input values 122 and 124. Table network 180 is configured to produce as output an encoded output value 160. In the description below we will assume data functions and state functions having two input values and a single output value. However, the embodiments may be extended to any number of input values and/or output values. In particular data/state functions with one input and one output are possible and data/state functions with two inputs and one output are possible.

Table network 180 is configured for the data function and is stored in an electronic storage, coupled to an electronic processor configured to compute the data function by applying the table network.

The encoded value 122 is obtained from a function input value 102 and a state input value 112. For example, this may be done by an encoder 110. Encoder 110 may be included in the same device which stores table network 180, but this is not needed. Input values may be received already in encoded form and/or be transmitted in encoded form. Or they may be received/transmitted in un-encoded form. In the latter case they may be encoded and used internally in encoded form. There may also be a re-encoding, e.g., if outside of the device a different encoding is used. For example, function output value 162 and state output value 164 may be obtained from a decoder 170.

Encoded input of the data function may be the output of another table or table network. The latter may or may not be a table network configured for two functions. By combining table networks configured for different data functions, entire programs may be built up.

Encoder/decoder 110 and 170 may be obtained as each other's inverse. Encoder 110 may be obtained as follows. Each possible combination of function input value and state input value is listed. For example, if both are 4 bit wide, than there are 16*16=256 possible combinations. The 256 combinations may be mapped to itself in a random bijective order. The same applies to other sizes. Also an encryption function may be used, e.g., an 8 bit block cipher may be applied, using some secret encoding key.

The encoded input value contains the function input value 102 and state input value 112 in an interdependent way, e.g., the function input depends on all bits of the encoded input. Thus, knowing only part of encoded input value 122 will generally not allow one to find either function input value 102 or state input value 112.

Below we will give a number of embodiments using mathematical language. One advantage of combining function inputs values with state values is that the function inputs have multiple representations. Function $f$ refers to the data function and g to the state function. The function f is encoded into F such that a value in the domain of F has multiple representatives. In order to hide which function $f$ is being encoded, input(s) and output(s) of f have multiple representations in the domain and range of the encoded version F of $f$. The function F is designed such that whenever X is a representative of x, then F(X) is a representative of $f(x)$. In the sequel we sometimes speak about "long" variables (input/output of F) and "short" variables (input/output of $f$) to emphasize that each input/output of $f$ corresponds to multiple input/output of F, so that we need in general more bits to represent inputs/outputs from F than to represent inputs/outputs from $f$. One way, to obtain multiple representations for operands is described below. Again note that for simplicity, we consider functions with equal input and output symbols; this may be generalized.

Let W denote the set of operands we wish to encode. We introduce a finite set $\Sigma$ of "states" and a finite set V with cardinality equal to the product of the cardinalities of W and $\Sigma$. The elements of $W \times \Sigma$ are mapped in a one-to-one manner to V by a secret encoding function E. The representatives of the element w in W are the members of the set $$\Omega(w) = \{E(w,\sigma) | \sigma \in \Sigma\}.$$

The number of representatives of each element in W thus equals the cardinality of $\Sigma$. As a result, data paths carrying symbols from V are wider than data paths for carrying symbols from W. For example, if W is the set of 16-bits integers and the state space $\Sigma$ has $16 = 2^4$ elements, data paths for V use 16+4=20 bits, while data paths for W use 16 bits.

The embodiment below encodes a function of two variables. Consider a function f: $W \times W \to W$ that we wish to encode. We construct a function F: $V \times V \to V$ such that for all $w_1, w_2 \in W$ and $\sigma_1, \sigma_2 \in \Sigma$ we have that $$F(E(w_1,\sigma_1), E(w_2,\sigma_2)) \in \Omega(f(w_1,w_2)).$$

Or, stated in words: F maps any pair of representatives of $w_1$ and $w_2$ to a representative of $f(w_1, w_2)$.

The state of the representative of $f(w_1, w_2)$ can depend on both operands $w_1$ and $w_2$ and could even depend on both states $\sigma_1$ and $\sigma_2$, in either a deterministic or in a randomized manner. More specifically, the state can depend only on the states $\sigma_1$ and $\sigma_2$, which can be implemented by taking a function g: $\Sigma \times \Sigma \to \Sigma$ and by defining $$F(E(w_1,\sigma_1),E(w_2,\sigma_2)) = E(f(w_1,w_2),g(\sigma_1,\sigma_2)).$$

An interesting special case of the embodiment above arises if we take $\Sigma = W$. Then the function F that encodes $f$ using the function E also encodes the function g, albeit with a different encoding function $\tilde{E}$. That is, it cannot be deduced which of the two functions, for g, is being implemented by F. We define $\tilde{E}(x,y) = E(y,x)$. By computation we find that $$F(\tilde{E}(\sigma_1, w_1), \tilde{E}(\sigma_2, w_2)) = F(E(w_1, \sigma_1), E(w_2, \sigma_2)) =$$
$$E(f(w_1, w_2), g(\sigma_1, \sigma_2)) = \tilde{E}(g(\sigma_1, \sigma_2), f(w_1, w_2)).$$

A table for F thus implements the function $f$ if the encoding E is being used, and the function g if $\tilde{E}$ is being used as encoding function. In this way, it is proven that from table 130 alone one cannot tell which function is being used, since it could encode for at least two functions.

The table for F can serve to compute both f and g. Indeed, if E is used, then, as said before, the table for F implements f. The same table can also be used for implementing g by pre- and post processing inputs and output with the function $\tilde{E}$ $E^{-1}$. To be precise, let $w_1, w_2 \in W$, $\sigma_1, \sigma_2 \in \Sigma$, and write $v_i = E(w_i, \sigma_i)$, i=1, 2. Then we have that $$F((\tilde{E}E^{-1}(v_1), \tilde{E}E^{-1}(v_2)) = F(\tilde{E}(w_1, \sigma_1), \tilde{E}(w_2, \sigma_2)) =$$
$$F(E(\sigma_1, w_1), E(\sigma_2, w_2)) = E(f(\sigma_1, \sigma_2), g(w_1, w_2))).$$

Consequently, we have that $$\tilde{E}E^{-1}[F((\tilde{E}E^{-1}(v_1), \tilde{E}E^{-1}(v_2))] = (g(w_1, w_2), f(\sigma_1, \sigma_2)).$$

The encoded input values may be input values to a computer program, possibly containing or represented by the data function. The computer program may be running on a computer. The instructions of the computer program may be represented by the data function. The encodings and decodings may be under control of a secret key. The encoding and decoding tables themselves may be regarded as such a key. If an instruction $f$ operating on data encoded with encoding $E_k$ is applied, then it first decodes the data, then $f$ is applied on the decoded data, and subsequently the result is encoded again. That is, the data x results in the output $F(x) = E_k(f(D_k(x)))$. By direct storage of the function F, for example as a lookup table, the function $f$ and its semantics are hidden. In a specific embodiment, the decoding is the left inverse of encoding, that is, $D_k(E_k(x)) = x$ for all x. This has the advantage if two functions $f$ and g are encoded and decoded with the same functions $E_k$ and $D_k$, then encoded version of the function $f(g(x))$ can be done by using successively using the tables for $G(x) = E_k(g(D_k(x)))$ and $F(x) = E_k(f(D_k(x)))$. Indeed, it can be seen that for each x we have that $E_k$ $(f(g(D_k(x))) = F(G(x))$, so that the encoded version for $f(g(x))$ can be obtained from subsequent accesses of tables for G and for F. In this way, sequences of operations can be applied without encoding and decoding between successive operations, thus greatly enhancing the security. In an embodiment, encoding and decoding only take place at the secure side, while all encoded operations take place at an open, insecure side. The output(s) of one or more encoded functions may serve as input(s) to another encoded function. As we have seen this can be conveniently arranged if the encodings and decodings are each other's inverses. A preferred embodiment for executing a sequence of operations with our inventions is the following. First, in the secure domain, "short" variables are transformed to "long" variables. Randomization is involved to make sure that the "long" variables occur approximately equally often. This can for example be achieved by having a device that generates a random state $\sigma \in \Sigma$, and mapping the variable x on $E_k(x,\sigma)$ where $E_k$ is an encoding of the "long" variables. After all computations at the open side, all operating using "long" variables, the decoding $D_k$ is applied at the secure side, and next, the "short" variable corresponding to the decoded long variable is determined. Alternatively, the decoding and determination of the short variable is done in one combined step. The letter k denotes a secret, e.g. a secret key.

Having multiple representatives for variables implies that data-paths become longer. Also, it implies that the table for implementing the encoded version F of $f$ becomes larger. For example, consider a function $f(x,y)$ which has as input two 16-bits variables x and y and as output a 16-bits variable. A table for implementing an encoded version of $f$, without having multiple representatives, uses a table with $2^{16} \times 2^{16}$ entries, each table entry being 16 bits wide, which amounts to a table size of $2^{36}$ bits. Now assume that each 16-bits variable has 16 representatives; the set of representatives thus can be represented with 20 bits. We now use a table with $2^{20} \times 2^{20}$ entries, each table entry being 20 bits wide, which amounts to a table of size $5 \times 2^{42}$ bits. That is, the table is $5 \times 2^6 = 320$ times as large as without having multiple representatives.

Below an example is given of a construction of an encoder 110, decoder 170 and state extractor tables 212 and 214. We will assume a single function input and a single state input (there may be more of either), of each 4 bits.

| Function input | State input | Encoding |
|---|---|---|
| 0000 | 0000 | 0100 0110 |
| 0000 | 0001 | 0101 1000 |
| ... | ... | ... |
| 0000 | 1111 | 1100 1100 |
| 0001 | 0000 | 1001 0111 |
| 0001 | 0001 | 0111 1010 |
| ... | ... | ... |
| 1111 | 1111 | 0011 1001 |

The first two columns lists all possible combinations of function input values and state input values. The last column lists a random permutation of the number 0 to 255 in binary. Note that the encryption is perfect, in the sense that even with perfect knowledge of 256−2=254 input-output pairs, the remaining two pairs still have one bit of uncertainty in them. Perfect encoding, in an information theoretic sense is desirable, but not necessary for good results; For example, a less perfect but still very usable encoding could be obtained, by using say an 8 bit wide block cipher, i.e., a block cipher having a block size equal to the sum of an function input and a state input.

An encoding table is obtained by sorting on the first two columns, the resulting table shows how to obtain the last column (encoding) from the first two. By sorting on the last column, a table is obtained that decodes instead of encodes. By removing the first column and sorting on the last column a state extractor function is obtained. Note that generally, it is not needed to store both the input and output column. For example, if the input column is sorted and contains all possible combinations, it may be omitted.

Figure 2:
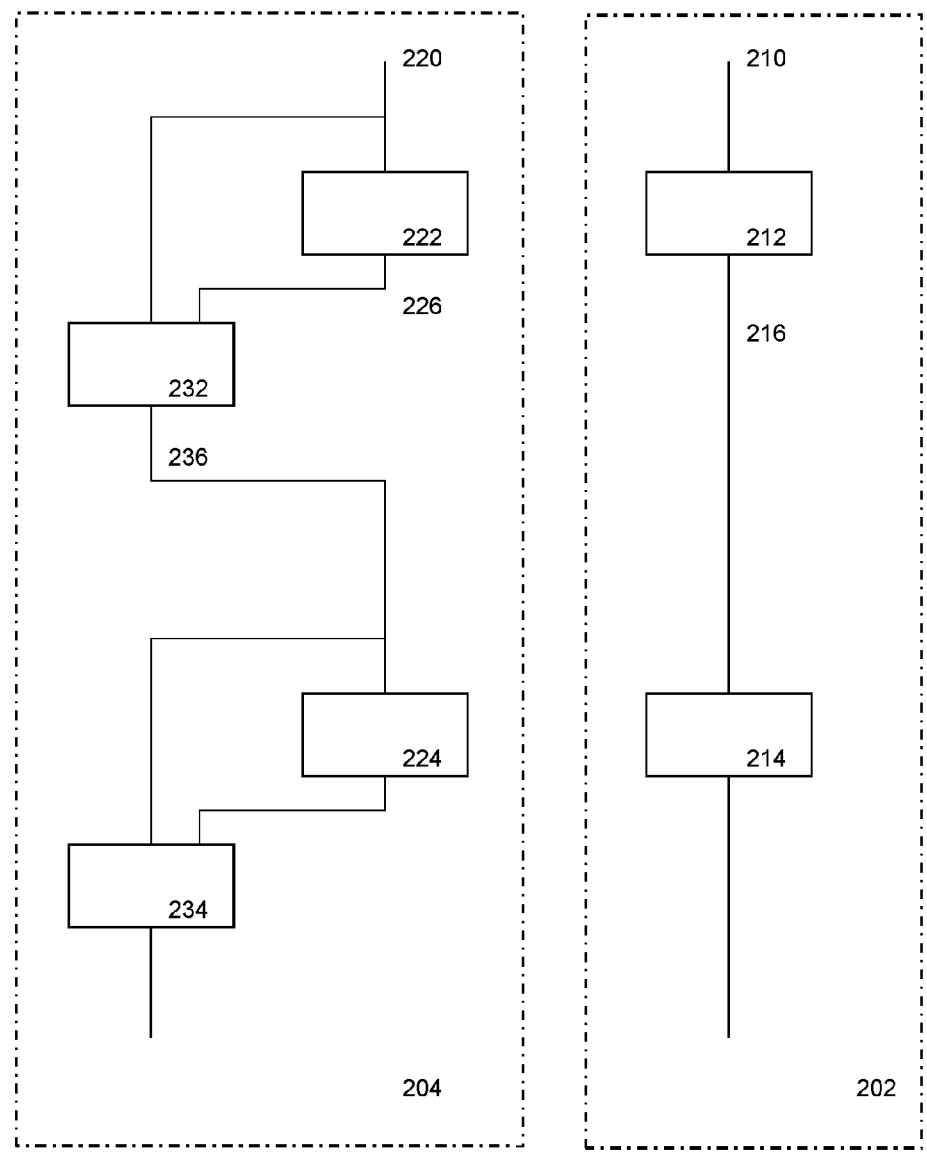
FIG. 2 is block diagram illustrating computing devices 202 and 204 configured with a table network.

FIG. 2 illustrates table networks 204 and 202 for use in a computation device having electronic storage and an electronic processor, e.g. the device shown in FIG. 5 (see below).

Shown for table network 202 are two first table networks 212 and 214. First table 214 uses as input the output 216 of first table 212. Table networks 212 and 214 may be of type of table network 180. First table 212 receives multiple inputs 210, and produces multiple outputs, among the inputs is a function input value and among the output is a function output value. To increase the clarity of diagrams, multiple inputs and multiple outputs are not shown in an individualized fashion, unless this was considered helpful in exposition. The function output value of table 212 is used as further input for table 214, which in turn produces multiple outputs. The multiple inputs and outputs of tables 212 and 214 are encoded so that an attacker cannot determine, at least not from a single value, what part corresponds to actual data and which do not. For example, tables 212 and 214 may receive as input one or more encoded inputs, which each combine a function input with a state input, and may each produce one or more encoded outputs. An often used combination is receiving two or more encoded inputs and producing one encoded output.

Using network 202 is advantageous since table 212 and 214 perform computations on data which is not directly relevant for the end results of the program of which table network 202 is part. However, an attacker may be able to attack the system by modifying table entries and observing the result. He would be looking for changes which do not seem to influence the running of the program, since from that he is able to deduce that the original and modified values are equal insofar function data is concerned.

Table network 204 has been constructed as an alternative to table network 202 to avoid this attack. Table network 204 comprises the first table networks 222 and 224, and additionally also table networks 232 and 234. First table networks 222 and 224 may be chosen as equal to tables 212 and 214 respectively.

Table network 232 receives as input the output 226 of table network 222 and shares at least part of its input with the inputs 220 of table network 222. The second table network is able to verify if the outputs 226 received from table 222 are compatible with what table 232 is given of the inputs 220. In particular, table 232 verifies at least for a specific one, but more preferably for all, of the multiple first table outputs 226 if an unmodified first table network 222 could obtain the specific one of the multiple first table outputs from the given at least one of the multiple first table inputs. Table (or table network) 232 may do this by table look-up operation. During construction of table 232, it is determined what all possible inputs 220 are and what all corresponding outputs 226 are, in fact this may be part of constructing table 222 itself. Next a table is made which notes for each combination of input and output of table 232 if it corresponds to an input/output pair of table 222 or not. Based on this determination table 232 has a different output (see below). Put in other words, table 222 determines the existence of a multiple first table input including the inputted at least one of the multiple first table inputs from which an unmodified first table network obtains the specific one of the multiple first table outputs.

A practical way to achieve this is to have one output of 226 that is computed only from part of the input 220. For example, inputs 220 may comprise a state and a function input. The output 226 may contain a function output, which is a function applied to the function input, and a state output. The state output is preferably only dependent upon the state input, but may also depend on the function input. Given the function input and all outputs of table 222, table 232 may verify that the function input and function output correspond, i.e., if the data function applied to the function input gives the function output. Alternatively or in addition, given the state input and all outputs of table 222, table 232 may verify that the state input and state output correspond, i.e., if the state function applied to the state input gives the state output. In preferred embodiments, the second table network at least verifies the state variables. Catching these kind of errors (i.e. modified state) is considered important since they may result in an unmodified program output (i.e., if the function value happens not to be changed). The latter kind of changes carry especially much information for the attacker.

Normally, table 232 will forward the output of 226 for use in the next table/table network, possibly performing some processing step on it. However, in case table 232 detects an error, i.e., the inputs and outputs of 222 can only have been obtained by tampering with table 222 or possibly the variables themselves, table 232 randomizes at least part of the output 226 before passing it on. We refer to an output value that is passed through a second table network as a protected output value. A protected value is useful for further computation in case no error was detected, but has been randomized in case tampering was detected.

The effect of protected variables is that the information that may be learned by tampering is significantly reduced. The attacker will find that if he tampers the output changes and the program does not function normally, but this is to be expected when tampering; the attacker does not learn anything from this fact per se. However, the useful information, e.g., which changes correspond to state and which to function data has disappeared because of the randomization. Randomization is preferred, but more subtle changes are also possible, as long as the protected function output is unequal to the function output in case the verification is unsuccessful. Note that the randomization is fixed in the table(s) during their construction. No random number generator is needed to apply the table network.

The output of table 232, is forwarded to a next table network, here tables 224 and 234. This corresponds to a table 214, which would receive the output in an unprotected network. Here 224 is a first table network and 234 is a second table network.

The table network 204 is stored on an electronic storage, say, flash or ram, and used by an electronic processor, i.e., by applying the table network to a data received from outside the device or generated on the device. Note that in typical embodiments, the inputs to the table network are encoded, according to an encoding secret to the attacker. For table networks an encoding is transparent, it does not involve any additional processing once the table is made. That is, applying a table to a plain value or to an encoded value is equal in processing requirement. Note that encodings may easily change between tables. An encoding is a mapping between a plain value and a value used internally.

Preferably, the table network 204 acts on variables which combine a function value with a state value. As the system computes on state values also, the attacker cannot tell from a table for which function it encodes, since the table simultaneously performs two functions. The role of state variable and function variable may interchange through the course of the program. In these embodiments, the tables simultaneously perform two functions. However, the number of functions performed simultaneously may also be chosen larger, further complicating analysis by the attacker. For example, a table may represent three functions, say the data function and a first and second state function; even larger numbers of functions are possible, say 4 or 5.

Below in mathematical language a list of possible embodiments of the second table network is given. In these examples, u, v, x, y, are variables that encode a function value and a state value; p, q, a are state values; w is a function value. The variable v is the final output of the first and second table network, which may be used in further downstream processing, e.g., tables. The function $f$ is a data function; g, g1 and g2 are state functions. The function $\sigma$ is a state extractor, $\rho$ a function value extractor and E an encoder function, i.e. $\sigma(E(w,p))=p$ and $\rho(E(w,p))=w$; all these functions may be implemented as tables. The function P is a function on state variables, preferably, a permutation. The function F corresponds to $f$ but is transcribed to the encoded domain, i.e., $$F(x,y)=E(f(\rho(x),\rho(y),g(\sigma(x),\sigma(y))).$$

The letter z denotes an align function, if the first input corresponds to the second and further inputs, the output is the first input, possibly with some further processing, if not the output is changed, e.g., randomized.

In these embodiments, the tables work on two function inputs. However, the number of inputs may be chosen as desired. The system may be applied to single-input, but interestingly also to multiple-input functions. We will use as an example state and functions that are 4 bits, and combined encodings of them which are 8 bits. Different sizes are clearly possible; say 2 bit for state, 6 bit for function, etc.

In all examples below the first table network implements the function u=F(x,y). This may be done by a single table with two encoded inputs and one encoded output.

The second table network may be any one of the following:

1. The second table network takes as input x, y and u, i.e. all of the inputs and output of the first table network. The second table network contains three tables. The first two are state extractors and the third is an align table: Input x, y. p=$\sigma$(x); q=$\sigma$(y); v=E(z(u,p,q),P($\sigma$(u))). Here z(u,p,q)=$\rho$(u) if g(p,q)=$\sigma$(u) and random otherwise. In other words, the second table network verifies that the first table network computed the state function correctly. If the verification is successful, u and v have equal values, but different states. If the verification detects an error, the value of v differs from the value of u. Note that the state receives a twist in the form of a permutation P. This embodiment uses three tables, with input sizes, 8, 8 and 16 bits.

2: The second table network takes as input x, y and u. The second table network contains one table. Input x, y. v=E(z(u,x,y),P($\sigma$(u))). Here z(u,x,y)=$\rho$(u) if F(x,y)=u and random otherwise. Here the full computation of the first table network is verified. The table has input size 8+8+8=24 bits.

3. The second table network takes as input x, y and u. The second table network contains two tables. Input x, y. a=g($\sigma$(x),$\sigma$(y)); v=E(z(u,a),P($\sigma$(u))). Here z(u,a)=$\rho$(u) if $\sigma$(u)=a and random otherwise. Here only the state part of the first table network is verified. The tables have input size 16, and 12 bit. As a variant one may use: v=E(z(u,a),P(a)) for the align table. This change is in particular relevant in case the verification fails.

As further variant the second table network uses: :=$\sigma$(x); q=$\sigma$(y); a=g(p,q); v=E(z(u,a),P($\sigma$(u))). Here the second table uses 3 tables, but has inputs of only 8, 8, and 12 bit.

4. The device acts on two kinds of variables: encoded variables which have both a state and a function value (long' variables) and a corresponding state-only variable (state-variables). The latter may also be encoded, but is smaller in size. With the example size, 'long variables' contain a function value and a state value and are 8 bit, and the corresponding state-variable is 4 bit. A long and state-variable correspond in the sense that their state variables are in a verifiable relation, e.g., are equal.

The first table network acts on long variables x and y as indicated above. The second table network takes as input the corresponding state-variables and u. Having a state-variable corresponding to a long variable makes it possible to make different subsets from the multiple input of the first table available to the second table. We refer to $\tau_x$ and $\tau_y$ as the state-variables corresponding to x and y. Note that the state-variables are part of the input of first table network, since the encoded long variables contain the state-variables, i.e., $\tau_x=\sigma(x), \tau_y=\sigma(y)$. The second table network takes shares these input since it uses as input $\tau_x$, $\tau_y$ and u contains two tables to compute $\tau_u=g(\tau_x,\tau_y)$; $v=E(z(u,\tau_u),P(\tau_u))$. Here $z(u,\tau_u)=\rho(u)$ if $\sigma(u)=\tau_u$ and random otherwise. The inputs to the tables in the second network are only 8 and 12 bits. Note that $\tau_x$, $\tau_y$ may be separate variables that are kept track of, independent of the actual value of $\sigma(x)$ and $\sigma(y)$. The program has been configured that these values may be verified against each other, say for equality.

5. The second table network takes as input $\tau_x$, $\tau_y$ and the second table network contains two tables to compute $\tau_u=g_2(g_1(\tau_x,\tau_y))$; $v=E(z(u,\tau_u),P(\tau_u))$. Here $z(u,\tau_u)=\rho(u)$ if $g2(\sigma(u))=\tau_u$ and random otherwise. Here $g_1$ is the state function g used in the first table network. The state computation table in the second table network performs an additional function on the state values, which is not done in the first table network. The align table then verifies this fact, and corrects for it. In this way it is impossible to omit the align table by the attacker, since it would case state and function values to be unaligned. In the next align table the mismatch would be detected and corrected.

Note that these examples differ in a number of respects. First of all they have different input and output sizes, which will lead to different table sizes. Table size is an important criterion if the size of the program needs to be kept within bounds. Also the examples differ in what values are available to an attacker. It is considered an advantage to an attacker if state values are available without the encoding with a function value. Depending on the exact requirements on size and security a choice between these alternatives can be made. Note that it is not necessary that a program uses only a single choice. Different second tables may use different variants.

Figure 3:
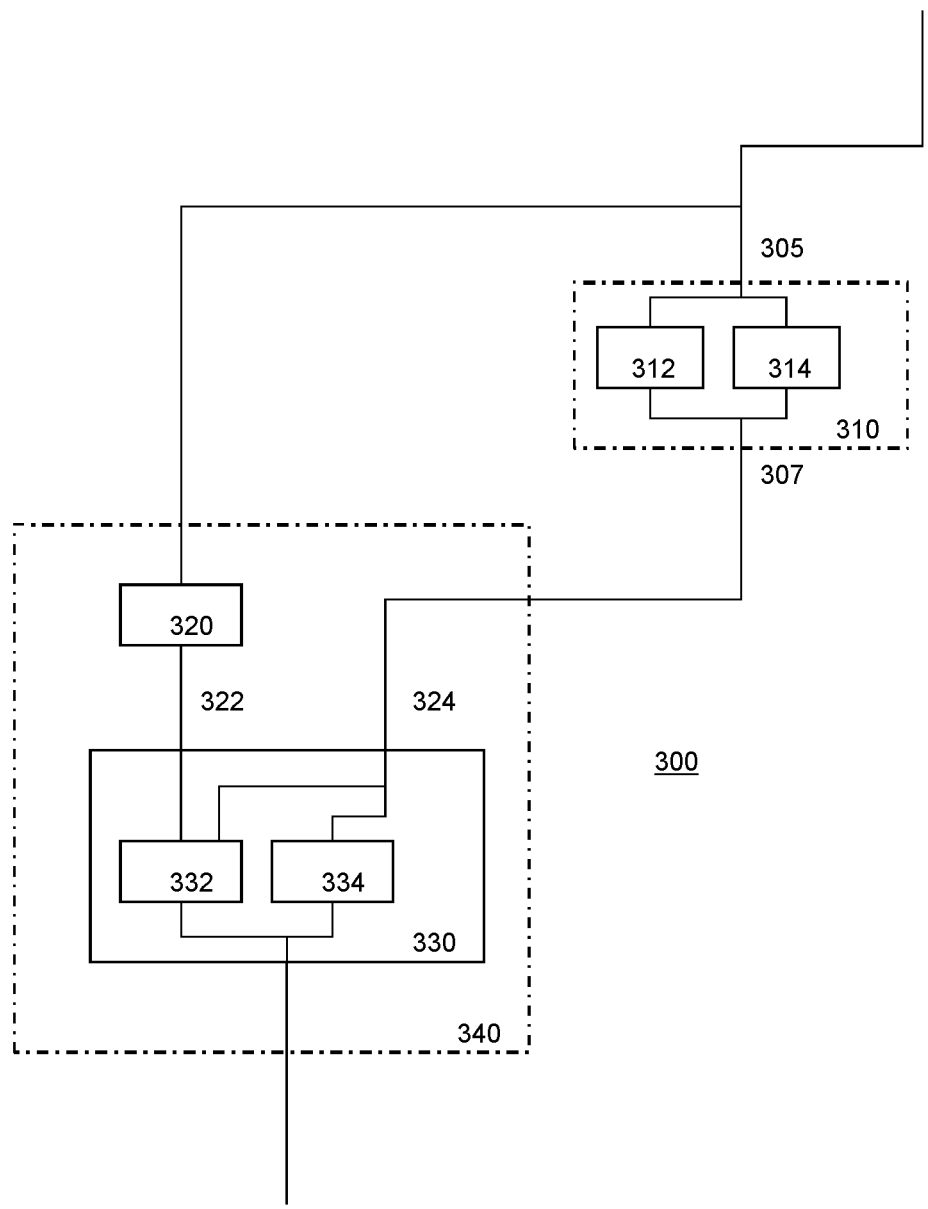
FIG. 3 is block diagram illustrating a table network.
Figure 8A:
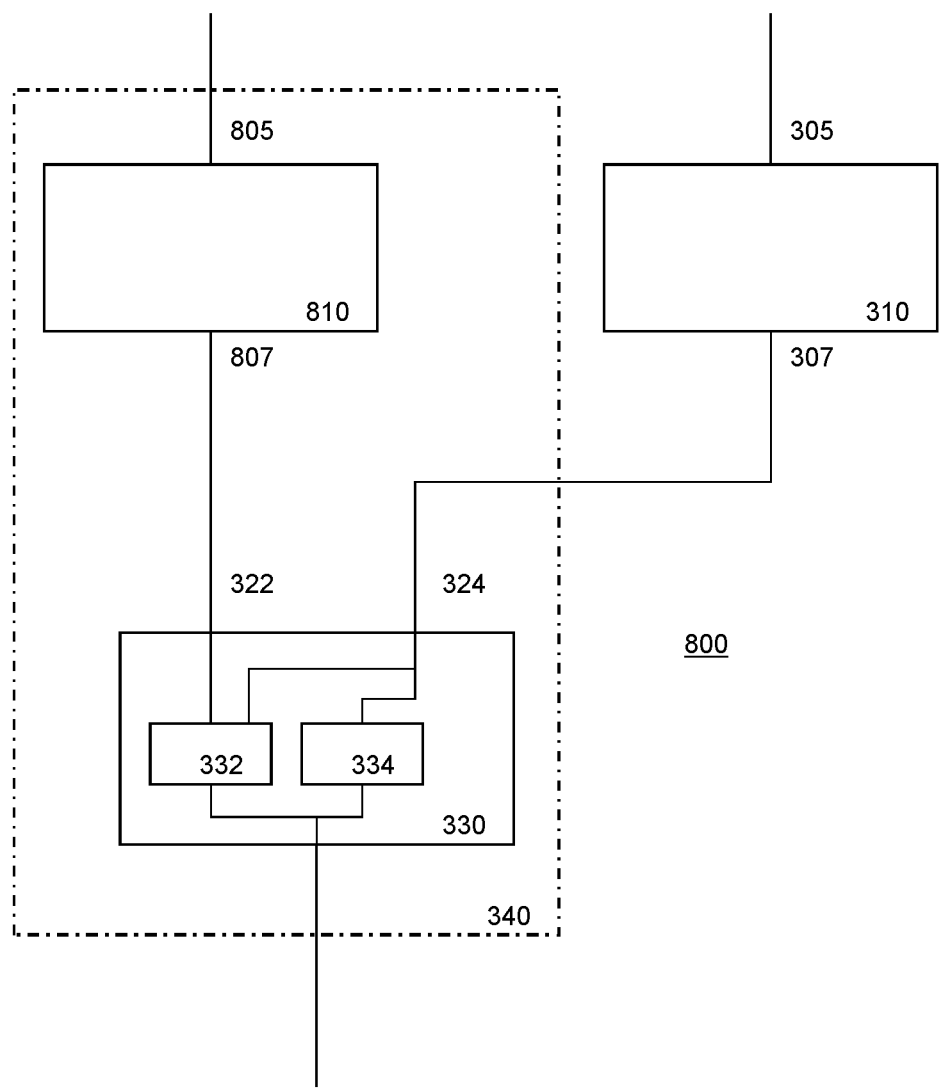
FIGS. 8a and 8b are block diagrams illustrating a table network.
Figure 8B:
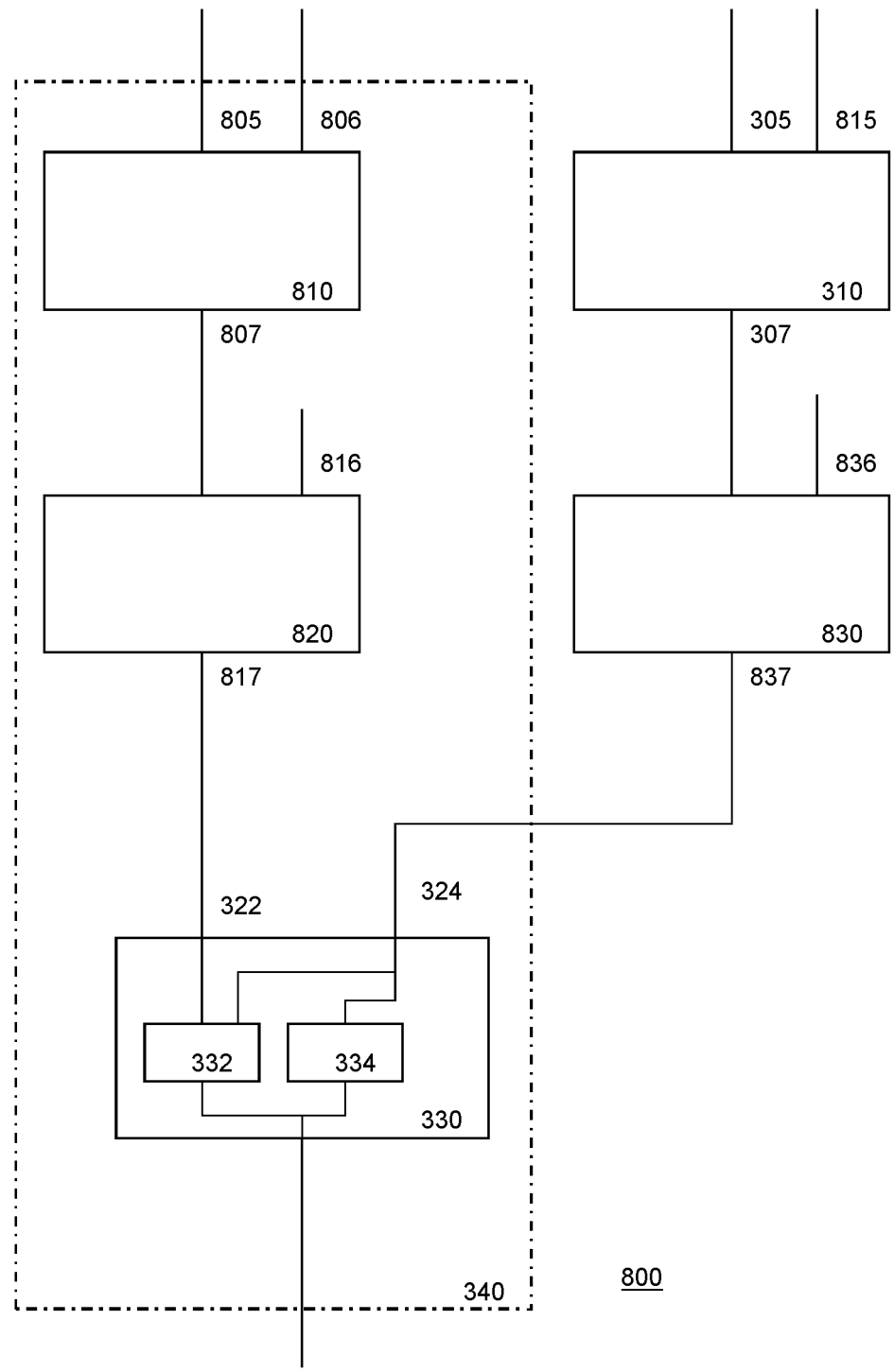

FIGS. 3, 8*a* and 8*b* illustrate a number of these possibilities for a data function and state function taking a single input. For example, FIG. 3 illustrates a computing device 300. The device stores a first table network 310 and second table network 340.

The first table network 310 takes as input 305 a long variable $x=E(w,p)$. Table 310 is constructed to apply a function f 312 on the function part and a function g 314 on the state part. Note that in the actual implementation these parts are not directly visible; table 310 works directly on the encoded value, by looking up the value in a pre-computed table. Table 310 produces an output 307: $u=E(f(w),g(p))$. The second table network as two tables: table 320 and 330. The second table network takes x as input and applies a state extractor table 320 to it to obtain the extracted state 322: $p=\sigma(x)$. The extracted state 322 and output 307 are inputs to align table 330. The align table has been constructed from a function z 332 and a permutation 334. Here $z(u,p)=\rho(u)$ if $\sigma(u)=p$ and random otherwise. Permutation 334 applies a permutation to a state, here the choice was for the state obtained from table 310, but the state from table 320 was also possible. Having a permutation in the align table ensures that the output of the table always changes, regardless of the fact whether a change has been detected or not. This avoids an attack in which a change in table 330 is used to determine the changes introduced by tampering. Also table 330 is a single table, in which functions 332 and 334 are not separately visible.

FIG. 8*a* illustrates a computing device 800 comprising working memory storing a collection of long variables, encoding a function value and a state value and a corresponding collection of state-variables. To each one of the collection of long variables are particular one of the collection of state-variables corresponds. A long and state-variable have a verifiable relationship. For example, the long variable encodes a state value which is also encoded in the state-variable. For example, the long variable encodes a state value whereas the state-variable encodes a function of that state value.

A table network is stored on device 800. A first table network 310 is used as described above, taking as input a long variable (shown is the situation in which a single long variable is received, but more are possible, the formulas above illustrate the situation in which two long variables are received, more is also possible).

Table 310 receives multiple inputs, i.e., a function value and state value. Note that these two inputs are encoded together; nevertheless table 310 acts on the inputs in different ways. In particular, table 310 may very well act on the function and state input independently from each other.

The second table network comprises a state function table 810 and an align table 330. For table 330 the same table as in FIG. 3 may be used. State function table 810 takes as input a subset of the multiple inputs of table 310; in particular the state values are received. This may be implemented by applying table 810 to the state-variables corresponding to the long variables to which table 310 is applied; alternatively 805 may be part of a path that develops independently of the development of path 305. Table 810 implements the same state function as table 310.

In preferable implementations the state function used by both state function table 810 and table 310 act independent from the function. This greatly simplifies implementation. Nevertheless it is possible to introduce function value dependencies in the state function table. In this case, state function table 810 uses part of intermediate results from table 310, in its computation. Care ought to be taken not to expose function values in plain form when this is done; if on the other hand the next state only depends on present states, not on function values, exposure of the state values is less critical.

Table 810 produces as output 807 the result of applying the state function to the state value: $g(\tau_x)$. Note that this value is a state value (not combined with a function value) but will in typical implementation be encoded. In table networks it is not unusual to encode data, as this does not deter from processing in any way. Interestingly, multiple inputs, say function and state values may be encoded together, i.e., encrypted into a single value. Encoding a state variable may be done with a random permutation of the state space. The output of table 340 may be used in subsequent processing, e.g., further table networks.

FIG. 8*b* describes an interesting variation. Shown are a first table network containing a table 310, receiving long inputs 305 and 815 and table 830 using an output 305 of the table 310 and a further long input 836. The tables 310 and 830 are capable of computing a more complicated function on multiple encoded inputs. Corresponding to tables 310 and 830 are state function tables 810 and 820. They receive as input the state-variables corresponding to the long variables used by tables 310 and 830, i.e.: state-variables 805, 806, 807, 816, 817 correspond to long variables 305, 815, 307, 836 and 837 respectively.

Interestingly, this gives the possibility to run a segment of a computer program two times, once using a table network acting on long variables and once acting on corresponding state-variables. At the end of the segment an alignment table verifies if the two programs are still in sync.

Figure 9:
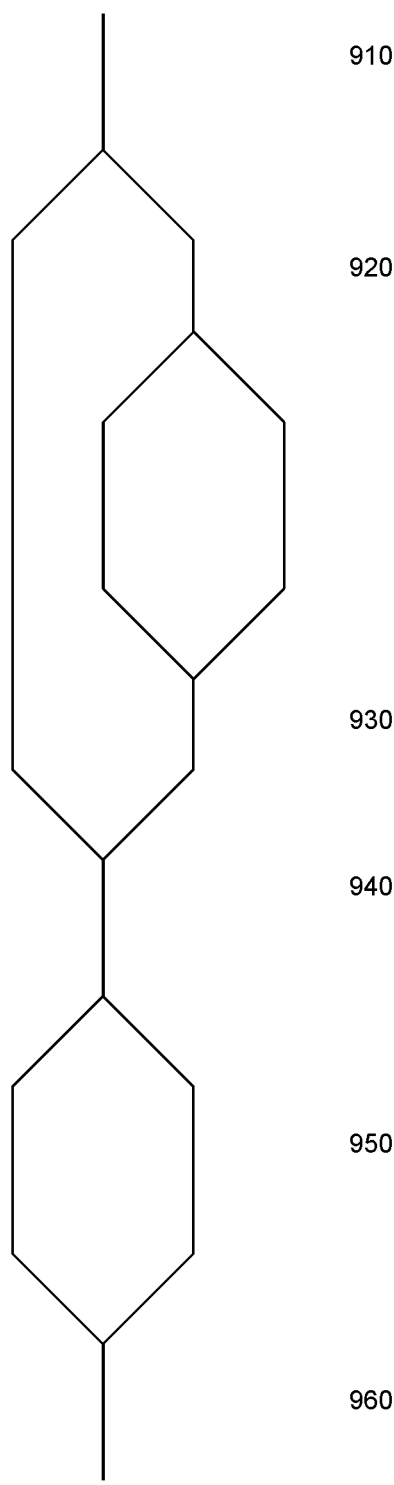
FIG. 9 is a diagram illustrating a program flow.

This is further illustrated in FIG. 9. As in all figures, program execution runs from the top of the figure to the bottom. At 910 the program is running in one single thread. No additional verifications are made. At some point a more security sensitive part is entered. At the point the program bifurcates into two parts, say at the left state-variables are evaluated while at the right long variables are evaluated. This occurs at 920. At some point an even more critical part is entered. At this point, say the long variables are completely evaluated twice. At the end of that section an align table ensures that no changes were made; this is done at 930. Even if changes were detected the program continues to run, but with values that are cleared from useful correlations. At 940 the first bifurcation also ends, again with an align function. At 950 the program continues to run as two threads, say on state and long variables. Finally, at 960 there is another align function and the program runs again as a single thread.

Figure 5:
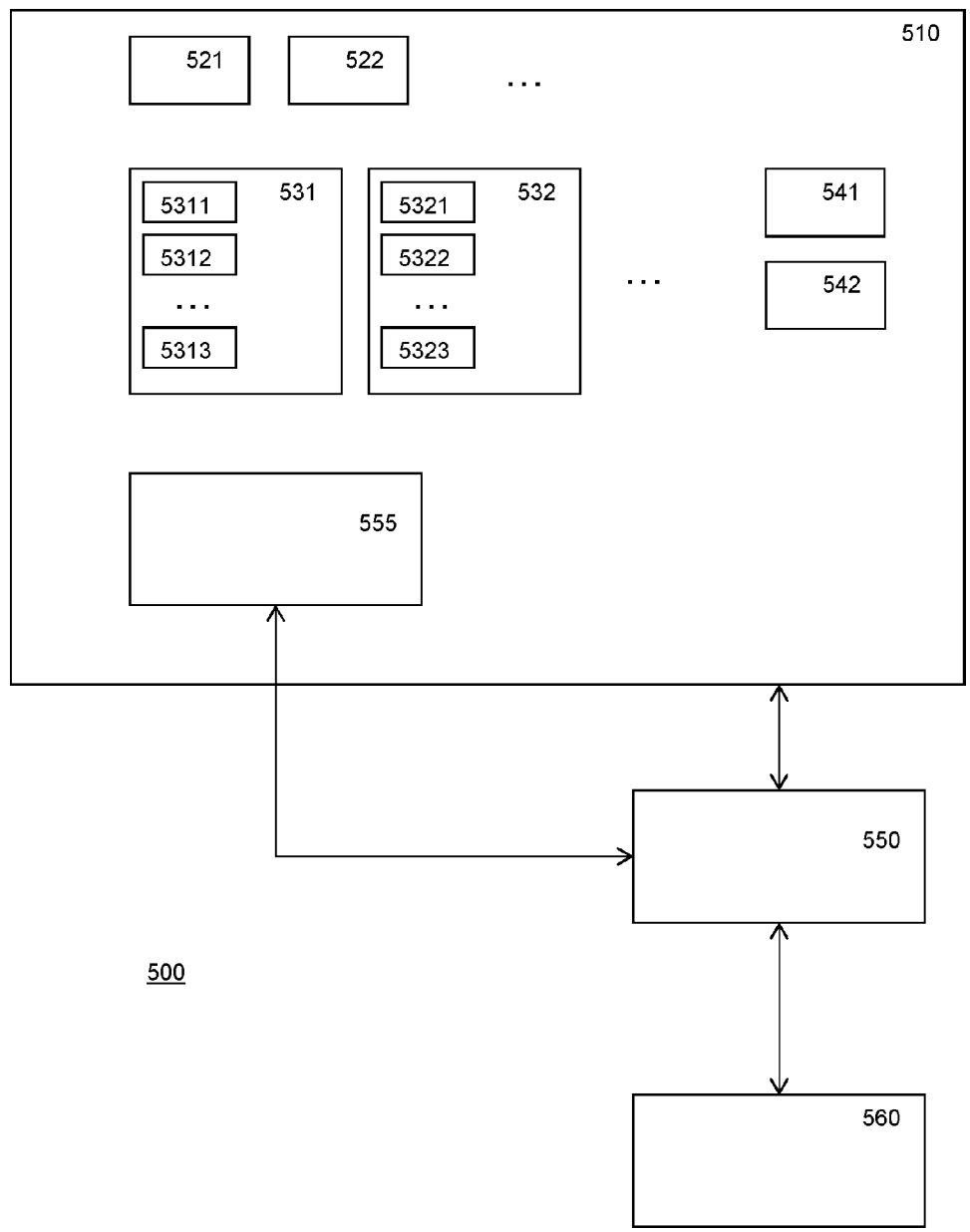
FIG. 5 is a block diagram illustrating a computing device.

FIG. 5 shows a computing device 500, having a storage device 510. The device shown in FIG. 5 may used with the table networks illustrated in FIGS. 1, 2, 3, 4, 8a, 8b and 9; in particular as computing devices 100, 204, 202, 300, and 800.

Storage device 510 is typically one or more non-volatile memories, but may also be a hard disc, optical disc, etc. Storage device 510 may also be a volatile memory comprising downloaded or otherwise received data. Computing device 500 comprises a processor 550. The processor typically executes code 555 stored in a memory. For convenience the code may be stored in storage device 510. The code causes the processor to execute a computation. Device 500 may comprise an optional I/O device 560 to receive input values and/or transmit results. I/O device 560 may be a network connection, removable storage device, etc.

Storage device 510 contains one or more table networks according to one of the FIGS. 1 to 3.

In an embodiment, the computing device may work as follows during operation: computing device 500 receives input values. The input values are encoded, e.g. by using the encoding table 541, e.g. table 110. Thus the input values are obtained as encoded input values. Note that the input values could be obtained as encoded input values directly, e.g. through device 560. Encoding an input value to an encoded input value implies that a state input has to be chosen. There are several ways to do so, for example the state input may be chosen randomly, e.g., by a random number generator. The state input may be chosen according to an algorithm; the algorithm may be complicated and add to the obfuscation. The state input value may also be constant, or taken sequentially from a sequence of numbers, say the sequence of integers having a constant increment, say of 1, and starting at some starting point; the starting point may be zero, a random number, etc. Choosing the state inputs as a random number and increasing with 1 for each next state input choice is a particular advantageous choice. If the state inputs are chosen off-device the attacker has no way to track where state input values are chosen and what they are.

Processor 550 executes a program 555 in memory 510. The program causes the processor to apply look-up tables to the encoded input values, or to resulting output values. Look-up tables may be created for any logic or arithmetic function thus any computation may be performed by using a sequence of look-up tables. This helps to obfuscate the program. In this case the look-up tables are encoded for obfuscation and so are the intermediate values. In this case the obfuscation is particularly advantageous because a single function input value may be represented by multiple encoded input values. Furthermore, some or all table and/or table networks have the multiple function property, of the table networks that have the multiple function property some or all are paired with a second table network for verification of the results.

At some point a result value is found. If needed the result may be decoded, e.g. using the decoding table 542, e.g. table 170 illustrated in FIG. 1. But the result may also be exported in encoded form. Input values may also be obtained from input devices, and output values may be used to show on a screen.

The computation is performed on encoded data words. The computation is done by applying a sequence of table look-up accesses. The input values used may be input values received from outside the computing device, but may also be obtained by previous look-up table access. In this way intermediate results are obtained which may then be used for new look-up table accesses. At some point one of the intermediate results is the encoded result of the function.

Computing device 500 may comprise a random number generator for assigning state input values to data function inputs.

Figure 6:
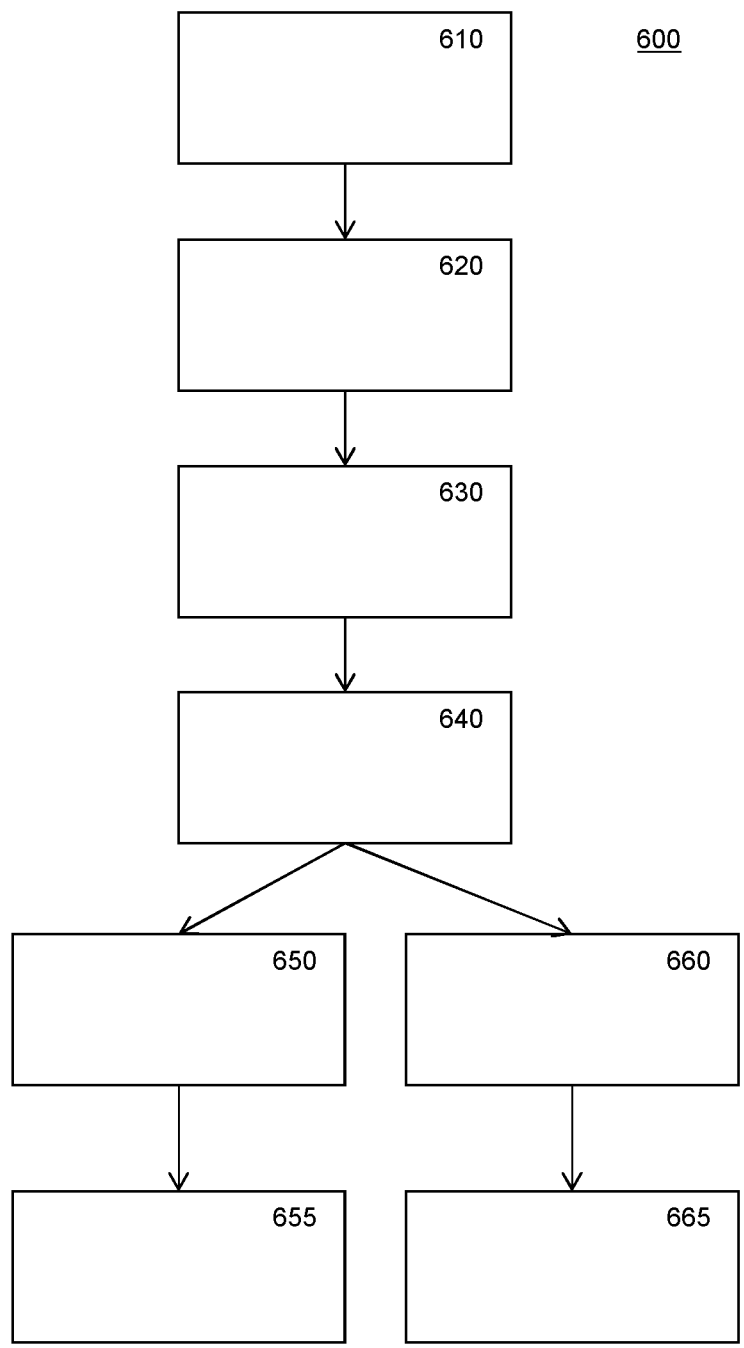
FIG. 6 is a flowchart illustrating a compiler.

FIG. 6 illustrates as flow chart a compiling method 600. In step 610 a first computer program is received by a receiver. In step 620 a lexical analysis is performed, e.g., to identify tokens, by a lexical analyzer. Possibly processing such as macro expansion is also done. In step 630 the program is parsed by a parser. For example, the parser generates a parsing tree according to a formal grammar of the programming language of the first program. The parser identifies the different language constructs in the program and calls appropriate code generation routines. In particular, an operator or multiple operators are identified. In that case, in step 640 code generation is done by a code generator. During code generation some code is generated and if needed accompanying tables. The accompanying tables include tables that are configured for two functions: one for the needed operator and a state function, i.e., first tables or first table networks. Some of the first table networks are paired with a corresponding second table network. There are various ways to decide which first table networks to pair with a second table network. The compiler may be configured to pair all first table networks with a second table network. The compiler may be configured to detect start and stop tags in the received computer program indicating to the compiler to start generating second table networks and corresponding code for applying them to the output of the first table networks. The compiler may generate second table networks for a random sample of the first table networks.

The generated code does not need, and generally will not, contain the operator as it is replaced by one or more look-up tables. The state function may be chosen at random. The state function may also be chosen as a result of the program, for example, the state function may be another needed operator, which will allow the table to be re-used. For example, the parser will identify and add operation and translate this into a look-up table for the add instruction and in generated code for applying the look-up table to the correct values. As the state function the compiler may select a random function. The compiler may also select at random a function from a set of functions, say addition, subtraction, multiplication and the like.

In step 655 the generated tables are merged to a table base, since it may well happen that some tables are generated multiple times, in that case it is not needed to store them multiple times. E.g. an add-table may be needed and generated only once. When all code is merged and all tables are merged the compilation is finished. Optionally, there may be an optimization step.

Typically, the compiler uses encoded domains, i.e., sections of the program in which all value, or at least all values corresponding to some criteria, are encoded, i.e., have code word bit size (n). In the encoded domain, operations may be executed by look-up table execution. When the encoded domain is entered all values are encoded, when the encoded domain is left, the values are decoded. A criterion may be that the value is correlated, or depends on, security sensitive information, e.g., a cryptographic key.

An interesting way to create the compiler is the following. In step 630 an intermediate compilation is done. This may be to an intermediate language, e.g. register transfer language or the like, but may also be a machine language code compilation. This means that for steps 610-630 of FIG. 6 a conventional compiler may be used, which is does not produce table networks. However in step 640 code generation is done based on the intermediate compilation. For example, if machine language code was used, each instruction is replaced by a corresponding operator free implementation of that instruction, i.e., a table-based implementation of that instruction. This represents a particular straightforward way to create the compiler. FIG. 6 may also be used to generate a compiler that produces not machine language but a second programming language.

In an embodiment, the compiler is a compiler for compiling a first computer program written in a first computer programming language into a second computer program, the compiler comprises a code generator to generate the second computer program by generating tables and machine language code, the generated tables and the generated machine language code together forming the second computer program, the generated machine language code referencing the tables, wherein the compiler is configured to identify an arithmetic or logical expression in the first computer program, the expression depending on at least one variable, and the code generator is configured to generate one or more tables representing pre-computed results of the identified expression for multiple values of the variable and representing at least one other expression, and to generate machine language code to implement the identified expression in the second computer program by accessing the generated one or more tables representing pre-computed results. Ideally, the machine language code generated to implement the identified expression does not contain arithmetic or logic machine instructions itself, at least no arithmetic or logic machine instructions related to sensitive information. An attacker who reverse engineered the tables may find that it may represent the identified expression, but that it may also represent the other expression.

This increases resistance against reverse engineering and lowers, side-channel leakage of the second computer program because it contains fewer arithmetic or logic operations. Ideally all arithmetic and logical expressions and sub-expressions in are replaced by table accesses. Since those instructions which constitute the arithmetic or logical expression or sub expressions are absent they cannot leak any information. The table is pre-computed; the power consumed to perform the arithmetic or logical behavior enclosed in the table is not visible during execution of the program.

Below, further details and further embodiments are given of advantageous table networks.

As before we refer to W as the set of operands (input and output values of an operation) we wish to encode, and a finite set $\Sigma$ of "states" and a finite set V with cardinality equal to the product of the cardinalities of W and $\Sigma$. The data path extension described above more advantageous if there no easy way of eliminating it. If an attacker would be able to find or isolate each $\Omega(w)$, we consider the data path extension broken in terms of security. We describe two related attacks aiming to find equivalence classes $\Omega$.

The first attack is in an extended setting where a virtual machine (VM) and Program provide output to the user where the output is not state dependent (in fact one possibly encrypted variable which is not state dependent will do). For instance: A decryption engine providing images on a screen. In such a setting an attacker may do the following: For every variable v in the program of which he expects state information. The attacker writes down the original v value, starts replacing this variable with other values t. For all values t that produce the right images the attacker knows that t belongs to a $\Omega_v(w)$ set of which v is a representative. Even for images which are not correctly displayed the attacker could compare the resulting erroneous images and conclude that values s and t substituted for v resulting in the same errors would represent equal values. A second, similar attack is on the output of functional elements, like operators, which are probably tabulated, suppose in a table T. If a table output T[i] is used by the program, then the attacker could vary the value in location i of the table. If the algorithm succeeds, then the attacker knows that the new entry at position i (most likely) is in the set $\Omega(T[i])$.

Redundancy is added to program. As a result, during the execution of the program, faults can be detected and appropriate measures can be taken. In one of the embodiments, the reaction on a fault check is as follows: if a fault in a variable is detected, the value of the variable is changed (most likely resulting in an incorrect program output), while otherwise, the state of the variable changes, but its value remains the same.

Three components may be used
  Adding redundancy to a program, e.g., states in addition to operands, i.e., function values.
  Using redundancy during (or after) execution of the program to detect unexpected situations
  Taking actions as a result of using redundancy for detection of unexpected situations For example, different versions of an program may be run in parallel, e.g. interleaved. Different versions may have different encodings E and/or different initial values for the states of the variables in the programs. To be more specific, suppose we have a program P and run m versions in parallel. Version i uses encoding $E_i$ and has $\sigma_i$ as initial state vector for all (or some) of the variables. We denote the i-th version of P as $E_i(P, \sigma_i)$. Preferably, the encodings $E_1, E_2, \ldots, E_m$ are distinct.

All versions are run in parallel, and at any point of the program execution, it can be checked if one or more corresponding variables in the programs match or not. Note that we may omit checking the matching of one or more variables, and that not all checked variables need to be checked in all programs. For example, if we have three versions of a program P with three variables x, y, z, we may check the variable x for match in all three versions, check for a match of variable y between versions 1 and 3, and not check variable z at all. In case of a mismatch, various actions can be taken, e.g., stopping of the execution of the program, continue to run with modified values, etc.

Running multiple programs in parallel can be quite costly. We now describe a second embodiment that is more economical, and aims to thwart attacks in which tables are changed. As an illustrative example, we consider protection against changing entries in a table implementing a function $f$ of two variables.

We use the following notation. We define the functions w: $V \to W$ and $\sigma: V \to E$ by the requirement that for each $v \in V$, we have that $E(w(v), \sigma(v)) = v$. We assume: a secret permutation P of $\Sigma$ The function F: $V \times V \to V$ implements a function $f$: $W \to W$ as explained above, so for each $x, y \in W$ and $\sigma, \tau \in \Sigma, F(E(x, \sigma), E(y, \tau)) = E(f(x, y), g(\sigma, \tau))$, where $g: \Sigma \times \Sigma \to \Sigma$ Whenever the function $f$ is to be computed, with inputs x and y, we could run the procedure as expressed by the pseudo code below.

p:=$\sigma(x)$; q:=$\sigma(y)$; u:=F(x,y); v:=E(z(u,p,q),P($\sigma(u)$));

The function z: $V \times \Sigma \times \Sigma \to W$ is such that $z(u,p,q) = w(u)$ if $\sigma(u) = g(p,q)$, and another value, say a random value, otherwise. For example, if $W = \Sigma$, we can take $z = w(u) - \sigma(u) + g(p,q)$. The evaluation of v can be done using a table T with entries labeled by elements from $V \times \Sigma \times \Sigma$ so that for $u \in V, p, q \in \Sigma$, $T[u,p,q] = E(z(u,p,q), P(\sigma(u)))$. In the above pseudo-code, the state values of x and y appear in the clear. This can be avoided if we use the following procedure: u:=F(x,y); v:=E(Z(u,x,y),P($\sigma(u)$)); the latter is implemented as a single table. The function Z: $V \times V \times V \to W$ is such that $Z(u,x,y) = w(u)$ if and only if $\sigma(u) = g(\sigma(x), \sigma(y))$. The evaluation of v can be done using a table T with entries labeled by elements of $V \times V \times V$ such that $T[u,x,y] = E(Z(u,x,y), P(\sigma(u)))$ for all $u, x, y \in V$.

As a third alternative, we can use the following procedure. a:=g($\sigma(x),\sigma(y)$); u:=F(x,y); v:=E(z(u,a),P($\sigma(u)$)), where the function z: $V \times \Sigma \to W$ is such that $z(u,a) = w(u)$ if and only if $a = \sigma(u)$. The evaluation of a can be done using a table T with entries labeled by elements of $V \times V$ such that $T[x,y] = g(\sigma(x), \sigma(y))$ for all $x, y \in V$ or labeled by entries of $\Sigma \times \Sigma$ if $\sigma(x), \sigma(y)$ appear in the program; in the latter case, $T[p,q] = a[p,q]$ for all $p, q \in \Sigma$. The evaluation of v can be done using a table U with entries labeled by elements from $V \times \Sigma$ such that $U[u,a] = E(z(u,a), P(\sigma(u)))$ for all $u \in V, a \in \Sigma$.

As a fourth alternative, we can use the following procedure, very similar to third one. a:=g($\sigma(x),\sigma(y)$); u:=F(x,y); v:=E(z(u,a),P(a)), where the function z: $V \times \Sigma \to W$ is such that $z(u,a) = w(u)$ if and only if $a = \sigma(u)$. The evaluation of a can be done using a table T with entries labeled by elements of $V \times V$ such that $T[x,y] = g(\sigma(x), \sigma(y))$ for all $x, y \in V$ or labeled by entries of $\Sigma \times \Sigma$ if $\sigma(x), \sigma(y)$ appear in the program; in the latter case, $T[p,q] = a[p,q]$ for all $p, q \in \Sigma$. The evaluation of v can be done using a table U with entries labeled by elements from $V \times \Sigma$ such that $U[u,a] = E(z(u,a), P(a))$ for all $u \in V, a \in \Sigma$.

The rationale for the first of the above procedure (a similar reasoning holds for the other variations) is illustrated below. Suppose an attacker modified the entry [x,y] in the table T implementing F from a to a'. We apply the above procedure with inputs x and y. We thus have that u=T[x,y]=a', and v=E(z(a',$\sigma(x),\sigma(y)$), P($\sigma(a')$)). We now consider two cases.

First we assume that w(a)=w(a'). As a$\neq$a', we have that $\sigma(a') \neq \sigma(a)$. As $\sigma(a) = g(\sigma(x), \sigma(y))$, it follows from the properties of z that w(u')$\neq$w(u)=w(a), and so, as we assumed that w(a)=w(a'), we have that w(v)$\neq$w(a'), that is, w(v)$\neq$w(a')=w (a)=w (F(x,y)). Stated in words: the value of v does not equal the value of F(x,y). That is: the program will be continued with a variable with an incorrect value, and the attacker will think that w(a)=w(a'). If w(a)$\neq$w(a'), the value of v may or may not equal the value of F(x,y). In the first case, the attacker thinks that w(a)=w(a'), which obviously is helping the defender. In the second case, the attacker will think that w(a)=w(a'), which is not very useful information to him.

In the above variations, we observe a transformation of the variable u to v which is such that w(u)=w(v) if and only if the state of u matches the state expected based on x and y. In a generalization, instead of matching state values, a function of state values is matched. For example, w(u)=w(v) if and only if the state and expected state agree in a given number of their Most Significant Bits (MSBs), or in a given number of their Least Significant Bits (LSBs), or if checksums over the symbols of the state and of the expected state agree.

The variations of the second embodiment protect against an attack in which table entries are changed. We next consider a third embodiment that offers protection against an attack in which a variable is changed. In order to do so, for each variable $x \in V$ that we wish to protect, we keep track of a corresponding variable $\tau_x \in \Sigma$ (which in normal circumstances should equal $\sigma(x)$). Whenever x is updated, $\tau_x$ is updated as well. Consequently, the parts of the programs for updating x and $\tau_x$ must be synchronized. Preferably, the update of $\tau_x$ does not use any of the variables used to update x, but only of the state-like variables corresponding to these variables. For example, suppose we have variables x, y $\in V$ with corresponding state-like variables $\tau_x, \tau_y$, and we change x to F(x,y). We then also update $\tau_x$ to $g(\tau_x, \tau_y)$, where $g: \Sigma \times \Sigma \to \Sigma$ is such that $F(E(w_1, \sigma_1), E(w_2, \sigma_2)) = E(f(w_1, w_2), g(\sigma_1, \sigma_2))$. (State-like variables are variables with values in $\Sigma$ instead of V.)

The state-mixing function g may be different for different functions F. That is, the way of updating $\tau_x$ may depend on the transformation that is being applied to x. More generally, the way of updating $\tau_x$ could depend on x before the update and/or the function (method, procedure?) that was used for updating x. The values of $\tau_x$ and $\sigma(x)$ can be checked every time the values of x and $\tau_x$ are updated, but this is not necessary. Whenever a check does take place, the following procedure may be applied: x:=E($\zeta(x, \tau_x), P(\tau_x)$); $\tau_x$:=P($\tau_x$); (A). Here, P is a permutation of $\Sigma$, and the function $\zeta$: $V \Sigma \to W$ is such that $\zeta(x, \tau) = w(x)$ if and only if $\sigma(x) = \tau$.

In words: if the state and expected state match, the value of x remains the same, but its state is changed; if the state and expected state do not match, the value of x is altered. The evaluation of x can be done using a table T with entries labeled by elements from $V \times \Sigma$ such that $T[x, \tau] = E(\zeta(x, \tau), P(\tau))$ for all $x \in V, \tau \in \Sigma$.

Note that after the procedure, we have that $\tau = \sigma(x)$. If the attacker manages to disable from the procedure either the updating of x or the updating of $\tau$ (but not both), then at subsequent check, $\tau$ and $\sigma(x)$ most likely are not equal, and the value of x will be changed (unless, the attacker also manages to disable the update x from the above procedure).

Equivalently, the order of assignments in (A) can be altered to $\tau_x$:=P($\tau_x$); x:=E($\zeta(x, \tau_x), \tau_x$) (A'), where $\zeta: V \times \Sigma \to W$ is such that $\zeta(x, \tau) = w(x)$ if and only if $\sigma(x) = P^{-1}(\tau)$, or, equivalently, if and only if $P(\sigma(x)) = \tau$. Again, evaluation of x can be done using a table with entries labeled by elements from $V \times \Sigma$.

An alternative procedure is the following:

$$x := E(\zeta(x,\tau), P(\sigma(x))); \tau := P(\sigma(x)); \qquad (B)$$

The evaluation of x can be done using a table with entries labeled by elements from $V \times \Sigma$ such that $T[x, \tau] = E(\zeta(x, \tau), P(\sigma(x)))$ for all $x \in V, \tau \in \Sigma$. Note that in this alternative, the update for $\tau$ may be done with a table U with entries labeled by elements from V, such that $U[x] = P(\sigma(x))$, or, if it does not harm to have $\sigma(x)$ appear explicitly, one can first find p:=$\sigma(x)$ with a table for $\sigma$, and subsequently find $\tau$:=Y[p] using a table Y with entries labeled by elements from W. The table Y has fewer entries than the table U.

In a more general setting, the new state of x after a check does not depend on σ(x) only, but on x. Then instead of (B) we use $$x := E(\zeta(x,\tau), Q(x)); \tau := Q(x)$$

where Q: V→Σ is such that Q(v)≠σ(v) for all v∈V. The evaluation of x can be done using a table with entries labeled by elements from V×Σ such that T[x,τ]=E(ζ(x,τ),Q(x))) for all x∈V,τ∈Σ.

Figure 7:
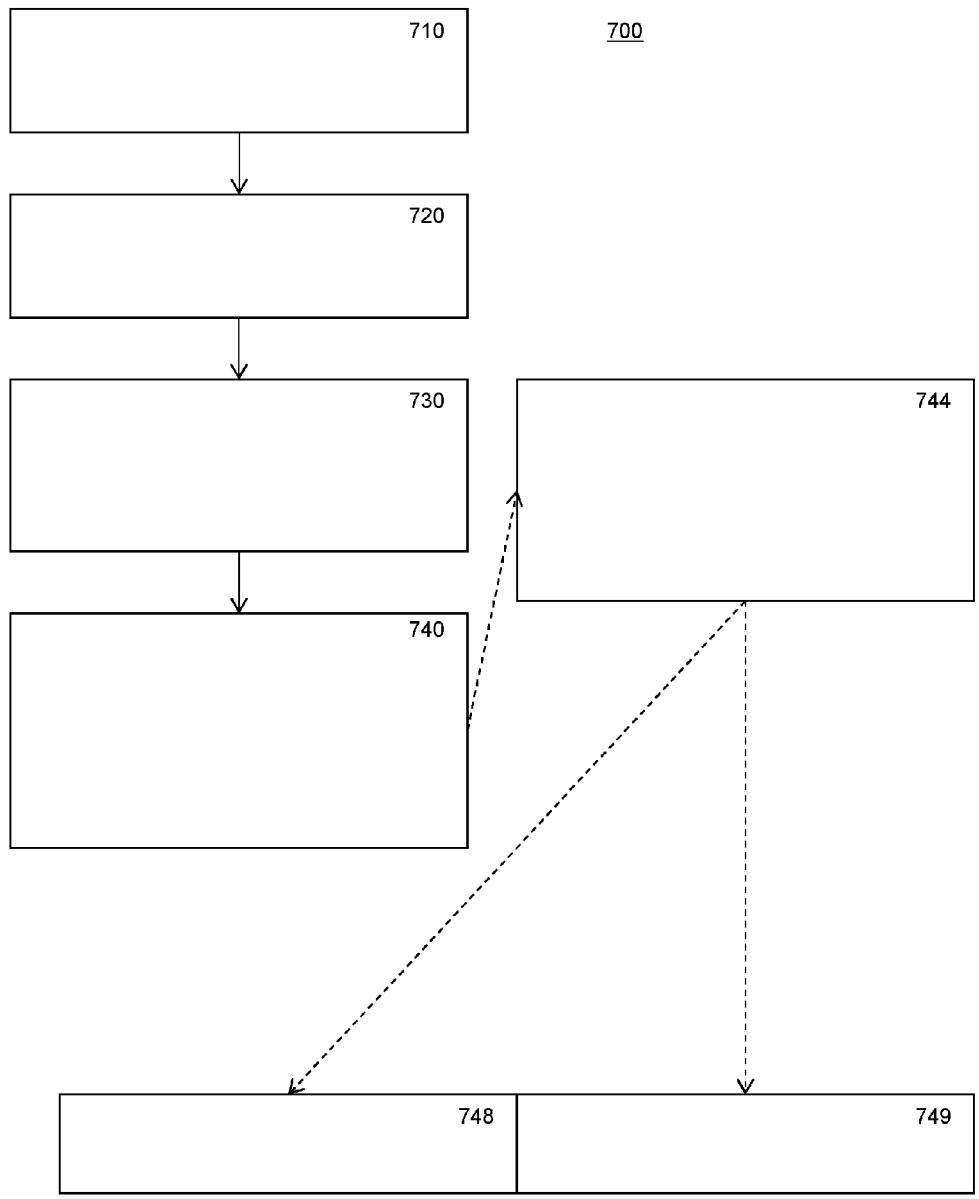
FIG. 7 is a flowchart illustrating a method for computing a function.

FIG. 7 illustrates in a flow chart a method 700. In step 710 multiple first table inputs are obtained for a first table network stored on an electronic storage. For example, they may be received from a prior table. In step 720 the first table network is applied to the multiple first table inputs to compute a data function. For example, computer program code may instruct the processor to look up a particular table entry in a table of the first table network, as indicated by the multiple inputs. Even though multiple inputs are used, this may be obscured by encoding some or all of these together. In step 730 multiple second table inputs are obtained for a second table network stored on an electronic storage, the second table inputs including the output of the first table network and at least one of the multiple first table inputs. In step 740 this second table network is then applied to the multiple second table inputs to produce second table outputs including a protected function output.

Also the second table network may be a single table in which a single table look-up is done, however, this table has been constructed so that several things happen together including the steps 744, 748 and 749; this has been illustrated with dashed arrows. In step 740 second table outputs are produced including a protected function output. In step 744, it is verified for at least a specific one of the multiple first table outputs if an unmodified first table network could obtain the specific one of the multiple first table outputs from the given at least one of the multiple first table inputs. Depending on this verification either step 748 or 749 is taken. In step 748 (i.e., in case the verification is unsuccessful, i.e., the value could not be obtained), the protected function output is unequal to the function output. In step 749 (i.e., in case the verification is successful, i.e., the value could be obtained), the protected function output is equal to the function output.

The protected output may be used in next computations. Note that the protected output may be encoded together with a state value, i.e., a state value obtained from the first table outputs. The state value is preferably permuted. Since function and state values are encoded together this has the effect that the whole encoded value appears to change. In preferred embodiments, the protected output is combined with a state value, and that the state value is always permuted, so that the attacker cannot see if 748 or 749 has been applied.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 744, 748 and/or 749 are in preferably executed in by a single table look-up or, in a different preferability trade-off, by a sequence of table look-ups in a single table network. Moreover, a given step may not have finished completely before a next step is started.

A method according to the invention may be executed using software, which comprises instructions for causing a processor system to perform method 700. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS OF FIGS. 1, 2, 3, 4, 5, 8a AND 8b 100 a table network
102, 104 a function input value
110 an encoder
112, 114 a state input value
122, 124 an encoded input value
130 a table for a data function and a state function
160 an encoded output value
162 a function output value
164 a state output value
170 a decoder
180 a table network
202, 204 computing devices
210, 220 first table inputs A
212, 222 first table network A
214, 224 first table network B
216, 226 first table outputs A
232 second table network A
234 second table network B
236 second table outputs A
300 computing device
305 input x=E(w,p)
307 output u 310 first table network
312 data function f
314 state function g
320 state extractor table
322 output of table 320 σ(x)=p
330 align table
332 z function
334 permutation
340 second table network
410 an input table
420 an intermediate table
430 an output table
500 a computing device
510 a storage device
521, 522 single input look-up tables
531, 532 multiple input look-up tables
5311-5323 single input look-up tables
541 encoding look-up table
542 decoding look-up table
550 a computer processor
555 machine language code
560 I/O device
800 a computation device
805,806,816 a state input
807,817 a state output
810,820 a state function table
830 a data function table
836 a function input

The invention claimed is:

1. A computing device for processing a secure transaction over a computer network that produces an indication when a table network is modified, the secure transaction including computing a data function on a function-input value, the device comprising:
a non-transitory storage device storing a first table network configured for the data function; and
an electronic processor coupled to the electronic storage and configured to obtain a plurality of first table inputs for the first table network, the plurality of first table inputs including the function-input value, and to compute the data function by applying the first table network to the plurality of first table inputs to produce a plurality of first table outputs, the plurality of first table outputs including a function-output value, the function-output value corresponding to the results of applying the data function to the function-input value, wherein
the non-transitory storage device further storing a second table network configured to cooperate with the first table network for countering modifications made to the first table network, the electronic processor being configured to obtain a plurality of second table inputs for the second table network, the second table inputs including the plurality of first table outputs and the second table inputs sharing at least one input with the plurality of first table inputs, and to apply the second table network to the plurality of second table inputs, the second table network being configured to verify for at least a specific one of the plurality of first table outputs if an unmodified first table network could obtain the specific one of the plurality of first table outputs from the given at least one of the plurality of first table inputs,
the second table network is configured to produce second table outputs including a protected function output, the protected function output being equal to the function output indicating the verification is successful and the protected function output being unequal to the function output indicatinq the verification is unsuccessful for at least some values of the plurality of first table inputs.

2. The computing device as in claim 1, wherein
the plurality of first table inputs include a state-input value and the plurality of first table outputs include a state-output value, wherein the state-output value equals the result of applying a state function to the state-input value, and
the second table network is configured so that the second table inputs shared with the plurality of first table inputs include the state-input value, the second table network is configured so that the protected function output is equal to the function output in case the result of applying the state function to the state-input value equals the state value included in the plurality of first table outputs inputted to the second table network.

3. The computing device as in claim 2, wherein the second table network comprises a state table network and an alignment table network, the state table being configured for the state function, the processor being configured to apply the state table to the state-input to obtain a parallel state output value, the alignment table network being configured to receive as input at least the parallel state output value and the state-output value received from the first table network.

4. The computing device as in claim 3 in which an encoded variable, encoded from a function value and a state value, and a state variable are maintained in parallel.

5. The computing device as in claim 2, wherein the second table network comprises a modified state table and an alignment table network, the state table being configured to receive as input the state-input value and to compute a modified state value, the modified state value being equal to the result of applying the state function to the state-input value followed by a further state function, the align table network is configured to take as input the state-output value and the modified state-output value and to verify that the further state function applied to the state-output value yields the modified state-output value.

6. The computing device as in any claim 1, wherein
the first table network is configured to take as input an encoded input value, the encoded input value combining the function-input value together with a state-input value encrypted together into a single value, and
the first table network is configured to produce as output a first encoded output value, the first encoded output value combining the function-output value together with a state-output value encrypted together into a single value, wherein the state-output value equals the result of applying a state function to the state-input value,
the second table network is configured to take as input the first encoded output value of the first table network and at least one of the state-input value and the function-input value, the second table network being configured to produce as output a second encoded output value, the encoded output value containing the protected function output.

7. The computing device as in claim 6 wherein, the second table network is configured to produce as output a second encoded output value, the encoded output value combining the protected function output value together with a protected state-output value encrypted together into a single value, the protected state-output being equal to the result of applying a state permutation to the state-output value.

8. The computing device as in claim 6, wherein
the second table network is configured to take as input the function-input value, the second table network is configured so that the protected function output is equal to the function output in case the result of applying the data function to the function-input value equals the function-output value encoded in the first encoded output value.

9. A computer-readable non-transitory medium having stored software for processing a secure transaction over a computer network that produces an indication when a table network is modified, the secure transaction including computing a data function on a function-input value, the method comprising acts of:
   receiving at a first table network a plurality of first table inputs for the first table network, the plurality of first table inputs including the function-input value, and producing a plurality of first table outputs, the plurality of first table outputs including a function-output value, the function-output value corresponding to the result of applying the data function to the function-input value;
   cooperating at a second table network with the first table network for countering modifications made to the first table network, the second table network receiving a plurality of second table inputs, the second table inputs including the plurality of first table outputs and the second table inputs sharing at least one input with the plurality of first table inputs, the second table network verifying for at least a specific one of the plurality of first table outputs if an unmodified first table network could obtain the specific one of the plurality of first table outputs from the given at least one of the plurality of first table inputs,
   the second table network producing second table outputs including a protected function output, the protected function output being equal to the function output indicating the verification is successful and the protected function output being unequal to the function output indicatinq the verification is unsuccessful for at least some values of the plurality of first table inputs.

10. An electronic method for processing a secure transaction over a computer network that produces an indication when a table network is modified, the secure transaction including computing a data function on a function-input value, the method comprising acts of:
   obtaining a plurality of first table inputs at a first table network stored on a computer-readable non-transitory medium, the first table network being configured for the data function, the plurality of first table inputs including the function-input value,
   computing the data function by applying the first table network to the plurality of first table inputs to produce a plurality of first table outputs, the plurality of first table outputs including a function-output value, the function-output value corresponding to the result of applying the data function to the function-input value,
   obtaining a plurality of second table inputs at a second table network stored on the computer-readable non-transitory medium, the second table network cooperating with the first table network for countering modifications ade to the first table network, the second table inputs including the plurality of first table outputs and the second table inputs sharing at least one of input with the plurality of first table inputs, and to apply the second table network to the plurality of second table inputs,
   verifying with the second table network at least a specific one of the plurality of first table outputs if an unmodified first table network could obtain the specific one of the plurality of first table outputs from the given at least one of the plurality of first table inputs, the second table network producing second table outputs including a protected function output, the protected function output being equal to the function output indicating the verification is successful and the protected function output being unequal to the function output indicating the verification is unsuccessful for at least some values of the plurality of first table inputs.

* * * * *